US012555537B2

(12) United States Patent
Cha et al.

(10) Patent No.: US 12,555,537 B2
(45) Date of Patent: Feb. 17, 2026

(54) MASKING CIRCUIT, GATE DRIVER, AND DISPLAY DEVICE

(71) Applicant: Samsung Display Co., LTD., Yongin-si (KR)

(72) Inventors: Nahyeon Cha, Yongin-si (KR); Kyungho Kim, Yongin-si (KR); Sang Yong No, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/966,320

(22) Filed: Dec. 3, 2024

(65) Prior Publication Data

US 2025/0239222 A1 Jul. 24, 2025

(30) Foreign Application Priority Data

Jan. 23, 2024 (KR) ........................ 10-2024-0009950

(51) Int. Cl.

| | |
|---|---|
| ***G09G 3/3233*** | (2016.01) |
| ***G09G 3/3266*** | (2016.01) |
| ***G09G 3/3291*** | (2016.01) |

(52) U.S. Cl.

CPC ......... *G09G 3/3233* (2013.01); *G09G 3/3266* (2013.01); *G09G 3/3291* (2013.01); *G09G 2300/0426* (2013.01); *G09G 2300/0819* (2013.01); *G09G 2300/0852* (2013.01); *G09G 2300/0861* (2013.01);

(Continued)

(58) Field of Classification Search

CPC .. G09G 3/3233; G09G 3/3291; G09G 3/3266; G09G 2300/0426; G09G 2300/0819; G09G 2300/0852; G09G 2300/0861; G09G 2310/0267; G09G 2320/045; G09G 2320/0673;

(Continued)

(56) References Cited

U.S. PATENT DOCUMENTS

2022/0044620 A1* 2/2022 Seo ...................... G09G 3/2092
2023/0074341 A1* 3/2023 Youn .................... G09G 3/3266

(Continued)

FOREIGN PATENT DOCUMENTS

KR 1020180031879 A 3/2018
KR 1020240068866 A 5/2024

*Primary Examiner* — Tom V Sheng
(74) *Attorney, Agent, or Firm* — CANTOR COLBURN LLP

(57) ABSTRACT

A masking circuit includes a ninth transistor including a control electrode connected to a second masking control node, a first electrode receiving a first clock signal, and a second electrode, a tenth transistor including a control electrode receiving a carry signal, a first electrode receiving a high gate voltage, and a second electrode connected to a first node, an eleventh transistor including a control electrode receiving a second enable signal, a first electrode connected to the first node, and a second electrode connected to the second masking control node, a twelfth transistor including a control electrode receiving a first enable signal, a first electrode connected to the second masking control node, and a second electrode connected to a second node, and a thirteenth transistor including a control electrode receiving the carry signal, a first electrode connected to the second node, and a second electrode receiving a low gate voltage.

20 Claims, 14 Drawing Sheets

(52) U.S. Cl.
CPC ............... *G09G 2310/0267* (2013.01); *G09G 2320/045* (2013.01); *G09G 2320/0673* (2013.01); *G09G 2330/021* (2013.01); *G09G 2330/028* (2013.01); *G09G 2340/0435* (2013.01)

(58) Field of Classification Search
CPC ....... G09G 2330/021; G09G 2330/028; G09G 2340/0435
USPC ............................................................ 345/55
See application file for complete search history.

(56) References Cited

U.S. PATENT DOCUMENTS

| | | | | |
|---|---|---|---|---|
| 2023/0186824 A1* | 6/2023 | Park | G09G 3/3266 | 345/55 |
| 2023/0260464 A1* | 8/2023 | Cho | G09G 3/3266 | 345/204 |
| 2024/0153424 A1* | 5/2024 | Kim | G11C 19/28 | |
| 2024/0355269 A1* | 10/2024 | Kim | G09G 3/32 | |
| 2024/0386825 A1* | 11/2024 | Kim | G09G 3/20 | |
| 2025/0006108 A1* | 1/2025 | No | G09G 3/3266 | |
| 2025/0046255 A1* | 2/2025 | Kwon | G09G 3/3233 | |
| 2025/0061841 A1* | 2/2025 | Kim | G09G 3/32 | |
| 2025/0157412 A1* | 5/2025 | Kim | G09G 3/32 | |
| 2025/0209985 A1* | 6/2025 | Kim | G09G 3/3233 | |
| 2025/0232726 A1* | 7/2025 | Cha | G09G 3/3233 | |

* cited by examiner

MASKING CIRCUIT, GATE DRIVER, AND DISPLAY DEVICE

This application claims priority to Korean Patent Application No. 10-2024-0009950, filed on Jan. 23, 2024, and all the benefits accruing therefrom under 35 U.S.C. § 119, the content of which in its entirety is herein incorporated by reference.

BACKGROUND

1. Field

Embodiments relate to a gate driver. More particularly, embodiments relate to a masking circuit improving reliability of a gate signal, a gate driver including the masking circuit, and a display device including the gate driver.

2. Description of the Related Art

Generally, a display device may include a display panel and a display panel driver. The display panel may include a plurality of gate lines, a plurality of data lines, a plurality of emission lines, and a plurality of pixels. The display panel driver may include a gate driver that provides gate signals to the gate lines, a data driver that provides data voltages to the data lines, an emission driver that provides emission signals to the emission lines, and a controller that controls the gate driver, the data driver, and the emission driver.

When an image displayed on the display panel is a still image or the display panel operates in an always-on mode, a driving frequency of the display panel may decrease to reduce power consumption.

When a portion of the image displayed on the display panel is the still image and another portion of the image is a moving image, decreasing a driving frequency of a portion of the display panel corresponding to the still image may be desired to further reduce the power consumption.

SUMMARY

Since a stage of the gate driver which outputs a gate signal receives an output of the previous stage as a carry signal and outputs the gate signal, decreasing only the driving frequency of the portion of the display panel may be difficult.

Embodiments provide a masking circuit preventing a ripple of a gate signal.

Embodiments provide a gate driver including the masking circuit.

Embodiments provide a display device including the gate driver.

A masking circuit in an embodiment of the disclosure may include a first switching element including a control electrode connected to a first masking control node, a first electrode connected to a second control node, and a second electrode connected to a third control node, a ninth switching element including a control electrode connected to a second masking control node, a first electrode which receives a first clock signal, and a second electrode connected to the third control node, a tenth switching element including a control electrode which receives a carry signal, a first electrode which receives a high gate voltage having a relatively high level, and a second electrode connected to a first intermediate node, an eleventh switching element including a control electrode which receives a second enable signal, a first electrode connected to the first intermediate node, and a second electrode connected to the second masking control node, a twelfth switching element including a control electrode which receives a first enable signal, a first electrode connected to the second masking control node, and a second electrode connected to a second intermediate node, and a thirteenth switching element including a control electrode which receives the carry signal, a first electrode connected to the second intermediate node, and a second electrode which receives a low gate voltage having a relatively low level.

In an embodiment, the first clock signal having a relatively high level may be applied to the third control node when the carry signal changes from an inactivation level to an activation level during a period in which the first enable signal has an activation level.

In an embodiment, the masking circuit may further include a second switching element including a control electrode which receives the carry signal, a first electrode which receives the relatively high gate voltage, and a second electrode connected to a third intermediate node, a third switching element including a control electrode which receives the first enable signal, a first electrode connected to the third intermediate node, and a second electrode connected to the first masking control node, a fourth switching element including a control electrode which receives the second enable signal, a first electrode connected to the first masking control node, and a second electrode connected to a fourth intermediate node, and a fifth switching element including a control electrode which receives the carry signal, a first electrode connected to the fourth intermediate node, and a second electrode which receives the relatively low gate voltage.

In an embodiment, the masking circuit may further include a sixth switching element including a control electrode connected to the third control node, a first electrode which receives the first clock signal, and a second electrode connected to a gate output node, a seventh switching element including a control electrode connected to a first control node, a first electrode connected to the gate output node, and a second electrode which receives the relatively low gate voltage, and an eighth switching element including a control electrode connected to the first control node, a first electrode which receives the first clock signal, and a second electrode connected to the third control node.

In an embodiment, the first to thirteenth switching elements may be P-type transistors.

In an embodiment, the masking circuit may further include a first masking capacitor including a first electrode which receives the first clock signal and a second electrode connected to the third control node, and a second masking capacitor including a first electrode connected to the first masking control node and a second electrode which receives the relatively low gate voltage.

In an embodiment, a gate pulse may be output from a gate output node when the first enable signal has an inactivation level during an entirety of a period in which the carry signal has an activation level, or the first enable signal changes from the inactivation level to an activation level while the carry signal has the activation level.

In an embodiment, a gate pulse may not be output from the gate output node when the first enable signal has an activation level during an entirety of a period in which the carry signal has an activation level, or the first enable signal changes from the activation level to an inactivation level while the carry signal has the activation level.

A gate driver in an embodiment of the disclosure may include a carry generation circuit which generates a carry signal based on a previous carry signal, a first clock signal, a second clock signal, and a low gate voltage having a relatively low level, and a masking circuit connected to the carry generation circuit. The masking circuit may include a first switching element including a control electrode connected to a first masking control node, a first electrode connected to a second control node, and a second electrode connected to a third control node, a ninth switching element including a control electrode connected to a second masking control node, a first electrode which receives the first clock signal, and a second electrode connected to the third control node, a tenth switching element including a control electrode which receives the carry signal, a first electrode which receives a high gate voltage having a relatively high level, and a second electrode connected to a first intermediate node, an eleventh switching element including a control electrode which receives a second enable signal, a first electrode connected to the first intermediate node, and a second electrode connected to the second masking control node, a twelfth switching element including a control electrode which receives a first enable signal, a first electrode connected to the second masking control node, and a second electrode connected to a second intermediate node, and a thirteenth switching element including a control electrode which receives the carry signal, a first electrode connected to the second intermediate node, and a second electrode which receives the low gate voltage.

In an embodiment, the first clock signal having a relatively high level may be applied to the third control node when the carry signal changes from an inactivation level to an activation level during a period in which the first enable signal has an activation level. In an embodiment, the masking circuit may further include a second switching element including a control electrode which receives the carry signal, a first electrode which receives the relatively high gate voltage, and a second electrode connected to a third intermediate node, a third switching element including a control electrode which receives the first enable signal, a first electrode connected to the third intermediate node, and a second electrode connected to the first masking control node, a fourth switching element including a control electrode which receives the second enable signal, a first electrode connected to the first masking control node, and a second electrode connected to a fourth intermediate node, and a fifth switching element including a control electrode which receives the carry signal, a first electrode connected to the fourth intermediate node, and a second electrode which receives the relatively low gate voltage.

In an embodiment, the masking circuit may further include a sixth switching element including a control electrode connected to the third control node, a first electrode which receives the first clock signal, and a second electrode connected to a gate output node, a seventh switching element including a control electrode connected to a first control node, a first electrode connected to the gate output node, and a second electrode which receives the relatively low gate voltage, and an eighth switching element including a control electrode connected to the first control node, a first electrode which receives the first clock signal, and a second electrode connected to the third control node.

In an embodiment, the masking circuit may further include a first masking capacitor including a first electrode which receives the first clock signal and a second electrode connected to the third control node, and a second masking capacitor including a first electrode connected to the first masking control node and a second electrode which receives the relatively low gate voltage.

In an embodiment, the carry generation circuit may include a first gate switching element including a control electrode which receives the first clock signal, a first electrode which receives the previous carry signal, and a second electrode connected to a first node, a second gate switching element including a control electrode connected to a first control node, a first electrode which receives the second clock signal, and a second electrode connected to a fifth node, a third gate switching element including a control electrode which receives the first clock signal, a first electrode connected to a second node, and a second electrode which receives the low gate voltage, a fourth gate switching element including a control electrode which receives the low gate voltage, a first electrode connected to the second node, and a second electrode connected to a third node, a fifth gate switching element including a control electrode connected to the first control node, a first electrode which receives the first clock signal, and a second electrode connected to the second node, a sixth gate switching element including a control electrode connected to the third node, a first electrode which receives the second clock signal, and a second electrode connected to a fifth intermediate node, a seventh gate switching element including a control electrode connected to the third node, a first electrode connected to a fourth node, and a second electrode connected to the fifth intermediate node, an eighth gate switching element including a control electrode which receives the second clock signal, a first electrode connected to the fourth node, and a second electrode connected to the second control node, a ninth gate switching element including a control electrode connected to the second control node, a first electrode which receives the first clock signal, and a second electrode connected to a carry output node, a tenth gate switching element including a control electrode connected to the first control node, a first electrode connected to the carry output node, and a second electrode which receives the low gate voltage, an eleventh gate switching element including a control electrode which receives the low gate voltage, a first electrode connected to the first node, and a second electrode connected to the first control node, and a fourteenth gate switching element including a control electrode connected to the first control node, a first electrode which receives the first clock signal, and a second electrode connected to the second control node.

In an embodiment, the carry generation circuit may further include a twelfth gate switching element including a control electrode which receives a reset signal, a first electrode which receives the first clock signal, and a second electrode connected to the first node, and a thirteenth gate switching element including a control electrode which receives the reset signal, a first electrode connected to the second control node, and a second electrode which receives the low gate voltage.

In an embodiment, the carry generation circuit may further include a first capacitor including a first electrode which receives the first clock signal and a second electrode connected to the second control node, a second capacitor including a first electrode connected to the third node and a second electrode connected to the fourth node, and a third capacitor including a first electrode connected to the fifth node and a second electrode connected to the first control node.

A display device in embodiments may include a display panel including a pixel including a first type switching element and a second type switching element different from the first type switching element, a gate driver which outputs a gate signal to the display panel, and a data driver which outputs a data voltage to the display panel. The gate driver may include a carry generation circuit which generates a carry signal based on a previous carry signal, a first clock signal, a second clock signal, and a low gate voltage having a relatively low level, and a masking circuit connected to the carry generation circuit. The masking circuit may include a first switching element including a control electrode connected to a first masking control node, a first electrode connected to a second control node, and a second electrode connected to a third control node, a ninth switching element including a control electrode connected to a second masking control node, a first electrode which receives the first clock signal, and a second electrode connected to the third control node, a tenth switching element including a control electrode which receives the carry signal, a first electrode which receives a high gate voltage having a relatively high level, and a second electrode connected to a first intermediate node, an eleventh switching element including a control electrode which receives a second enable signal, a first electrode connected to the first intermediate node, and a second electrode connected to the second masking control node, a twelfth switching element including a control electrode which receives a first enable signal, a first electrode connected to the second masking control node, and a second electrode connected to a second intermediate node, and a thirteenth switching element including a control electrode which receives the carry signal, a first electrode connected to the second intermediate node, and a second electrode which receives the low gate voltage.

In an embodiment, the pixel may include a first pixel switching element including a control electrode connected to a first pixel node, a first electrode connected to a second pixel node, and a second electrode connected to a third pixel node, a second pixel switching element including a control electrode which receives a data write gate signal, a first electrode which receives the data voltage, and a second electrode connected to the second pixel node, a third pixel switching element including a control electrode which receives a compensation gate signal, a first electrode connected to the third pixel node, and a second electrode connected to the first pixel node, a fourth pixel switching element including a control electrode which receives a data initialization gate signal, a first electrode which receives an initialization voltage, and a second electrode connected to the first pixel node, a fifth pixel switching element including a control electrode which receives an emission signal, a first electrode which receives a pixel high power voltage having a relatively high level, and a second electrode connected to the second pixel node, a sixth pixel switching element including a control electrode which receives the emission signal, a first electrode connected to the third pixel node, and a second electrode connected to a fourth pixel node, a seventh pixel switching element including a control electrode which receives a light-emitting element initialization gate signal, a first electrode which receives a light-emitting element initialization voltage, and a second electrode connected to the fourth pixel node, a storage capacitor including a first electrode which receives the pixel high power voltage and a second electrode connected to the first pixel node, and a light-emitting element including an anode electrode connected to the fourth pixel node and a cathode electrode which receives a pixel low power voltage having a relatively low level.

In an embodiment, a signal output from the masking circuit may be the compensation gate signal.

In an embodiment, a signal output from the masking circuit may be the data initialization gate signal.

In the masking circuit, the gate driver, and the display device in the embodiments, the masking circuit may include the ninth to thirteenth switching elements, and the first clock signal having the relatively high level may be applied to the third control node when the carry signal changes from the inactivation level to the activation level during a period in which the first enable signal has the activation level, so that the ripple of the gate signal due to the change in the first clock signal may be prevented from occurring.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
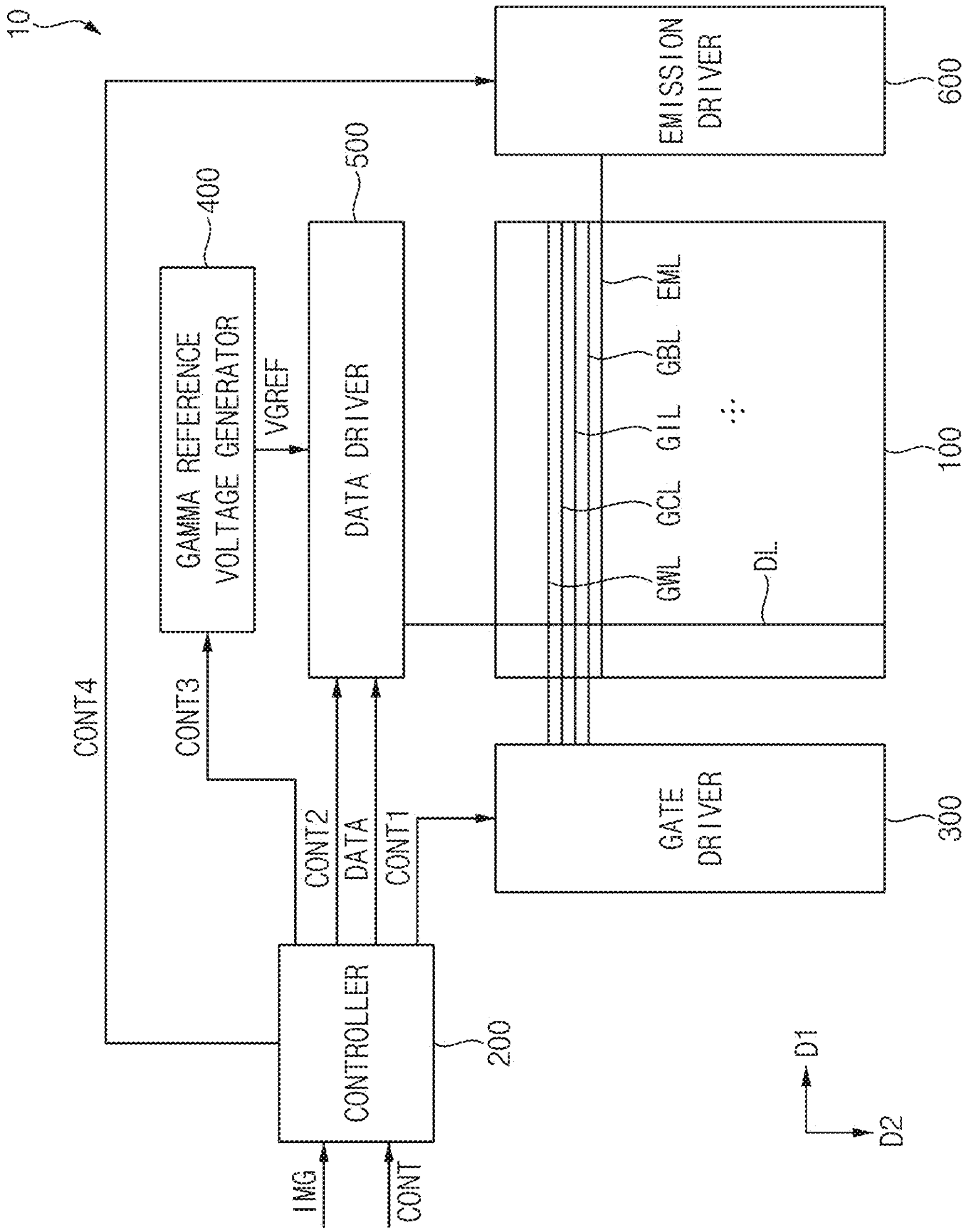
FIG. 1 is a block diagram showing an embodiment of a display device.

Hereinafter, a masking circuit, a gate driver, and a display device in embodiments of the disclosure will be described in more detail with reference to the accompanying drawings. The same or similar reference numerals will be used for the same elements in the accompanying drawings.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a block diagram showing an embodiment of a display device 10.

Referring to FIG. 1, a display device 10 may include a display panel 100 and a display panel driver. The display panel driver may include a controller 200, a gate driver 300, a gamma reference voltage generator 400, a data driver 500, and an emission driver 600.

The display panel 100 may include a display portion that displays an image and a peripheral portion disposed adjacent to the display portion.

The display panel 100 may include a plurality of gate lines GWL, GCL, GIL, and GBL, a plurality of data lines DL, a plurality of emission lines EML, and a plurality of pixels electrically connected to the gate lines GWL, GCL, GIL, and GBL, the data lines DL, and the emission lines EML. The gate lines GWL, GCL, GIL, and GBL may extend in a first direction D1, the data lines DL may extend in a second direction D2 crossing the first direction D1, and the emission lines EML may extend in the first direction D1.

The controller 200 may receive input image data IMG and an input control signal CONT from an external device. In an embodiment, the input image data IMG may include red image data, green image data, and blue image data, for example. In an embodiment, the input image data IMG may further include white image data, for example. In an embodiment, the input image data IMG may include magenta image data, yellow image data, and cyan image data, for example. The input control signal CONT may include a master clock signal and a data enable signal. The input control signal CONT may further include a vertical synchronization signal and a horizontal synchronization signal.

The controller 200 may generate a first control signal CONT1, a second control signal CONT2, a third control signal CONT3, and a fourth control signal CONT4, and a data signal DATA based on the input image data IMG and the input control signal CONT.

The controller 200 may generate the first control signal CONT1 for controlling an operation of the gate driver 300 based on the input control signal CONT. The controller 200 may output the first control signal CONT1 to the gate driver 300. The first control signal CONT1 may include a vertical start signal FLM (refer to FIG. 6) and a gate clock signal.

The controller 200 may generate the second control signal CONT2 for controlling an operation of the data driver 500 based on the input control signal CONT. The controller 200 may output the second control signal CONT2 to the data driver 500. The second control signal CONT2 may include a horizontal start signal and a load signal.

The controller 200 may generate the data signal DATA based on the input image data IMG. The controller 200 may output the data signal DATA to the data driver 500.

The controller 200 may generate the third control signal CONT3 for controlling an operation of the gamma reference voltage generator 400 based on the input control signal CONT. The controller 200 may output the third control signal CONT3 to the gamma reference voltage generator 400.

The controller 200 may generate the fourth control signal CONT4 for controlling an operation of the emission driver 600 based on the input control signal CONT. The controller 200 may output the fourth control signal CONT4 to the emission driver 600.

The gate driver 300 may generate gate signals for driving the gate lines GWL, GCL, GIL, and GBL in response to the first control signal CONT1 received from the controller 200. The gate driver 300 may output the gate signals to the gate lines GWL, GCL, GIL, and GBL.

The gamma reference voltage generator 400 may generate a gamma reference voltage VGREF in response to the third control signal CONT3 received from the controller 200. The gamma reference voltage generator 400 may provide the gamma reference voltage VGREF to the data driver 500. The gamma reference voltage VGREF may have a value corresponding to each data signal DATA. In an embodiment, the gamma reference voltage generator 400 may be disposed in the controller 200 or in the data driver 500, for example.

The data driver 500 may receive the second control signal CONT2 and the data signal DATA from the controller 200, and may receive the gamma reference voltage VGREF from the gamma reference voltage generator 400. The data driver 500 may convert the data signal DATA into an analog data voltage using the gamma reference voltage VGREF. The data driver 500 may output the data voltage to the data line DL.

The emission driver 600 may generate emission signals for driving the emission lines EML in response to the fourth control signal CONT4 received from the controller 200. The emission driver 600 may output the emission signals to the emission lines EML.

In FIG. 1, for convenience of description, the gate driver 300 is disposed on a first side (e.g., left side) of the display panel 100 and the emission driver 600 is disposed on a second side (e.g., right side) of the display panel 100, however, the disclosure is not limited thereto. In an embodiment, both the gate driver 300 and the emission driver 600 may be disposed on the first side of the display panel 100, for example. In an embodiment, both the gate driver 300 and the emission driver 600 may be disposed on opposite sides of the display panel 100, for example. In an embodiment, the gate driver 300 and the emission driver 600 may be unitary, for example.

Figure 2:
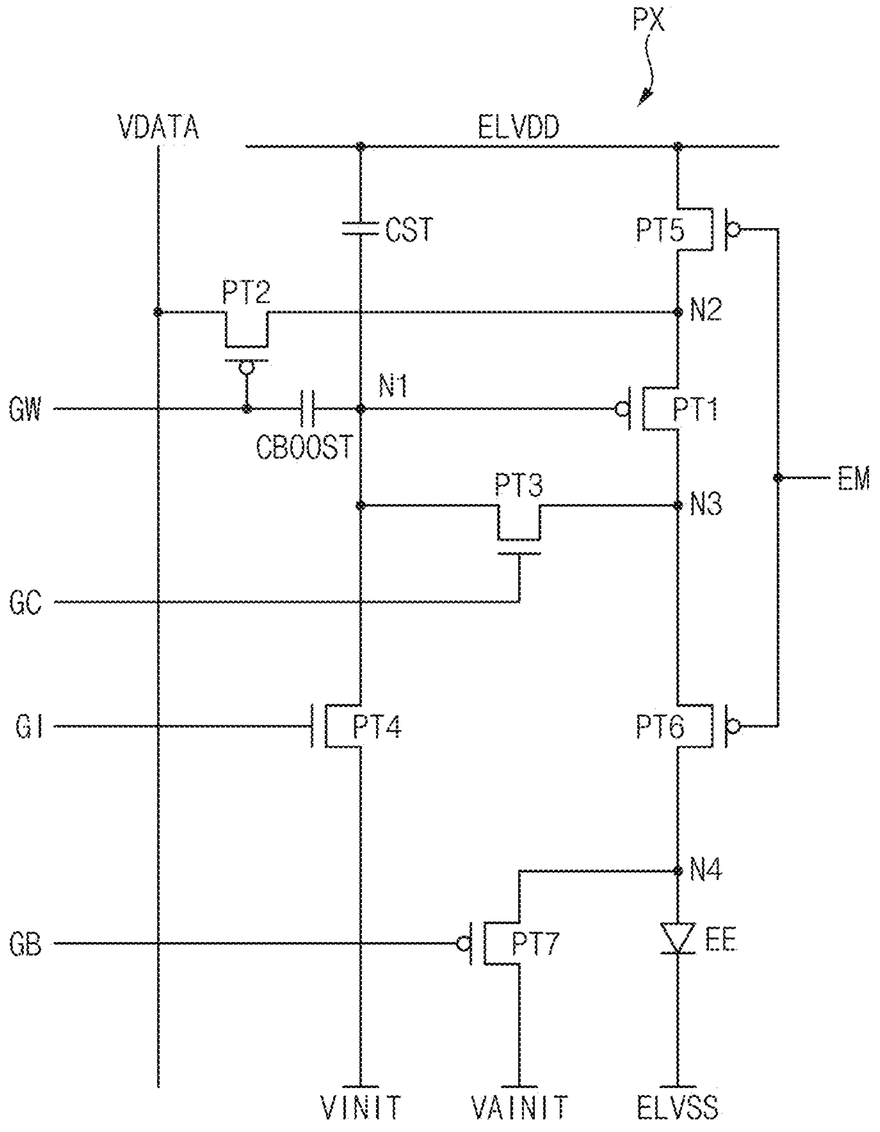
FIG. 2 is a circuit diagram showing an embodiment of a pixel included in the display device of FIG. 1.

FIG. 2 is a circuit diagram showing an embodiment of the pixel PX included in the display device 10 of FIG. 1.

Referring to FIGS. 1 and 2, the display panel 100 may include the pixel PX, and the pixel PX may include a light-emitting element EE.

The pixel PX may receive a data write gate signal GW, a compensation gate signal GC, a data initialization gate signal GI, a light-emitting element initialization gate signal GB, the data voltage VDATA, and the emission signal EM, and an image may be displayed by emitting light from the light-emitting element EE according to a level of the data voltage VDATA.

The pixel PX may include a first type switching element and a second type switching element that is different from the first type switching element. In an embodiment, the first type switching element may be a polysilicon transistor. In an embodiment, the first type switching element may be a low temperature polysilicon ("LTPS") transistor, for example. In an embodiment, the second type switching element may be an oxide transistor, for example. In an embodiment, the first type switching element may be a P-type transistor, and the second type switching element may be an N-type transistor, for example.

The pixel PX may include first to seventh pixel switching elements PT1 to PT7 and the light-emitting element EE.

The pixel PX may include a first pixel switching element PT1 including a control electrode connected to a first pixel node N1, a first electrode connected to a second pixel node N2, and a second electrode connected to a third pixel node N3, a second pixel switching element PT2 including a control electrode to which the data write gate signal GW is applied, a first electrode to which the data voltage VDATA is applied, and a second electrode connected to the second pixel node N2, a third pixel switching element PT3 including a control electrode to which the compensation gate signal GC is applied, a first electrode connected to the third pixel node N3, and a second electrode connected to the first pixel node N1, a fourth pixel switching element PT4 including a control electrode to which the data initialization gate signal GI is applied, a first electrode to which an initialization voltage VINIT is applied, and a second electrode connected to the first pixel node N1, a fifth pixel switching element PT5 including a control electrode to which the emission signal EM is applied, a first electrode to which a pixel high power voltage ELVDD is applied, and a second electrode connected to the second pixel node N2, a sixth pixel switching element PT6 including a control electrode to which the emission signal EM is applied, a first electrode connected to the third pixel node N3, and a second electrode connected to a fourth pixel node N4, a seventh pixel switching element PT7 including a control electrode to which the light-emitting element initialization gate signal GB is applied, a first electrode to which a light-emitting element initialization voltage VAINIT is applied, and a second electrode connected to the fourth pixel node N4, and the light-emitting element EE including an anode electrode connected to the fourth pixel node N4 and a cathode electrode to which a pixel low power voltage ELVSS is applied.

The pixel PX may further include a storage capacitor CST including a first electrode to which the pixel high power voltage ELVDD is applied and a second electrode connected to the first pixel node N1, and a boost capacitor CBOOST including a first electrode to which the data write gate signal GW is applied and a second electrode connected to the first pixel node N1.

In an embodiment, a signal output from a masking circuit of the gate driver 300 may be the compensation gate signal GC. In another embodiment, the signal output from the masking circuit of the gate driver 300 may be the data initialization gate signal GI.

A driving current of the pixel PX may flow through the fifth pixel switching element PT5, the first pixel switching element PT1, and the sixth pixel switching element PT6 to drive the light-emitting element EE. An intensity of the driving current may be determined by the level of the data voltage VDATA. A luminance of the light-emitting element EE may be determined by the intensity of the driving current.

In the illustrated embodiment, when an image displayed on the display panel 100 is a still image or the display panel 100 operates in an always-on mode, a driving frequency of the display panel 100 may decrease to reduce power consumption. When the switching elements of the pixel PX are all polysilicon transistors, a flicker may occur due to a leakage current of the switching element in a low-frequency driving mode. Accordingly, some of the switching elements of the pixel PX may be configured as oxide transistors. In the illustrated embodiment, the third pixel switching element PT3 and the fourth pixel switching element PT4 may be the oxide transistors. The first pixel switching element PT1, the second pixel switching element PT2, the fifth pixel switching element PT5, the sixth pixel switching element PT6, and the seventh pixel switching element PT7 may be polysilicon transistors.

In the illustrated embodiment, some switching elements of the pixel PX are the oxide transistors and other switching elements are the polysilicon transistors, but the disclosure is not limited thereto. The disclosure may also be applied to a pixel PX including only the oxide transistors. In the illustrated embodiment, some switching elements of the pixel PX are N-type transistors and other switching elements are P-type transistors, but the disclosure is not limited thereto. The disclosure may also be applied to a pixel PX including only the N-type transistors.

Figure 3:
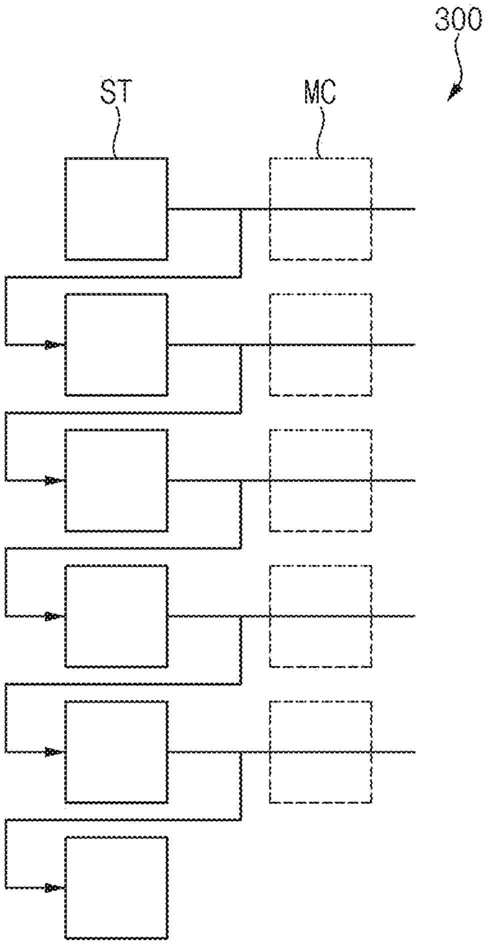
FIG. 3 is a view showing a gate driver included in the display device of FIG. 1.
Figure 4:
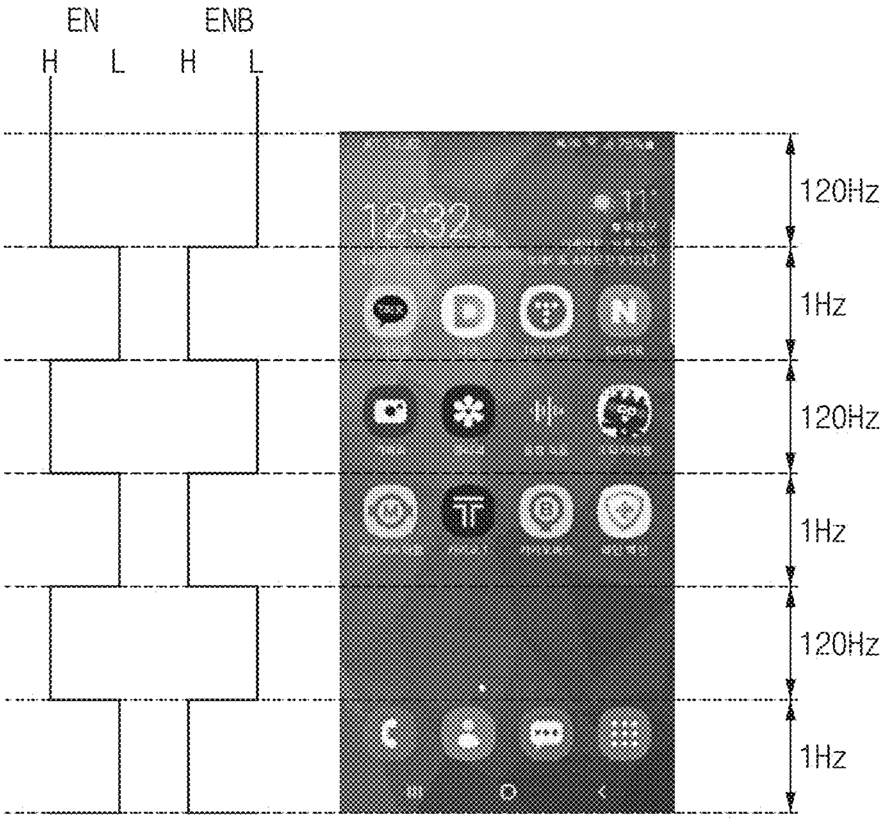
FIG. 4 is a view showing an embodiment of first and second enable signals applied to the gate driver of FIG. 3.
Figure 5:
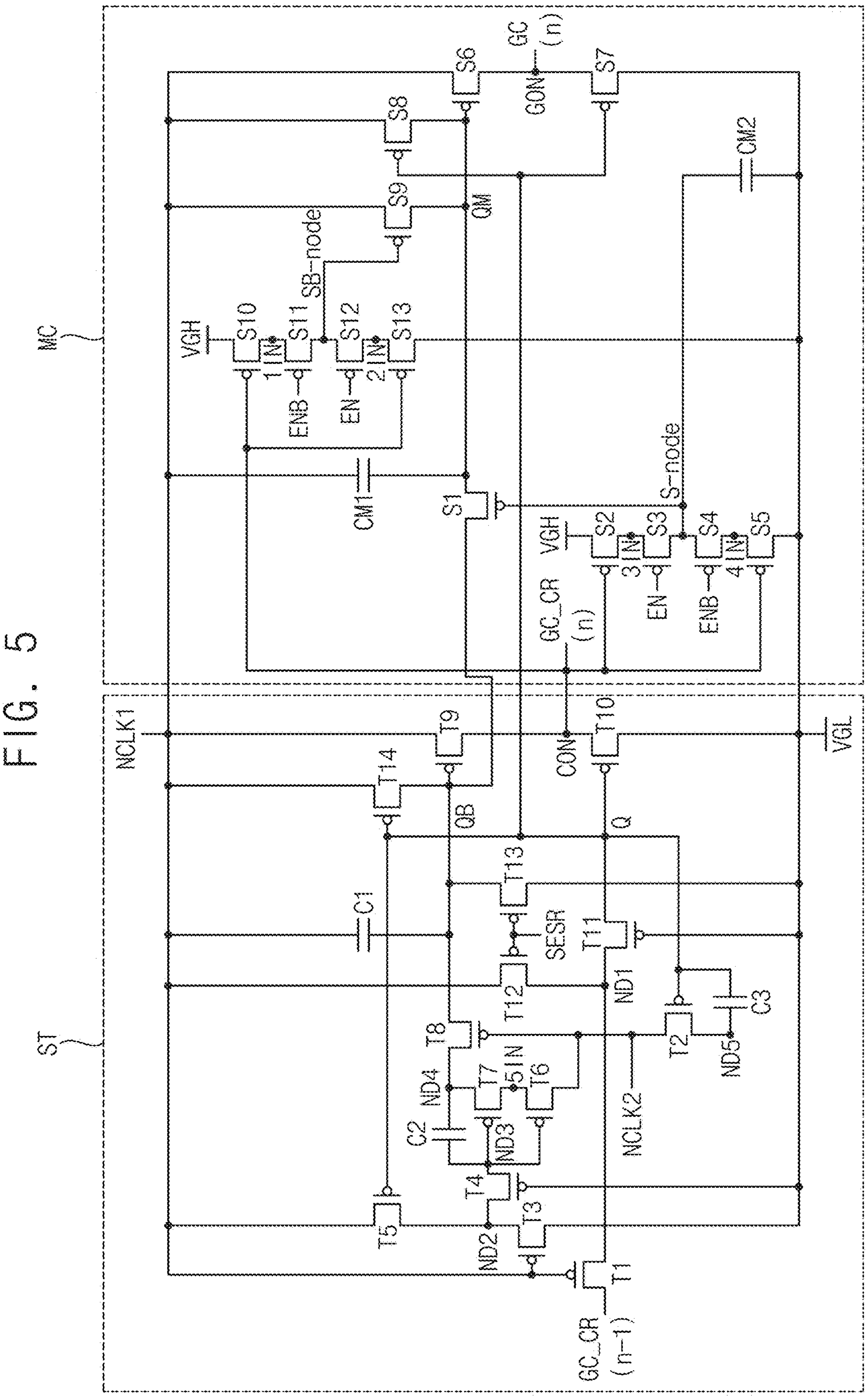
FIG. 5 is a circuit diagram showing a carry generation circuit and a masking circuit of the gate driver of FIG. 3.

FIG. 3 is a view showing the gate driver 300 included in the display device 10 of FIG. 1. FIG. 4 is a view showing an embodiment of first and second enable signals EN and ENB applied to the gate driver 300 of FIG. 3. FIG. 5 is a circuit diagram showing a carry generation circuit ST and a masking circuit MC of the gate driver 300 of FIG. 3.

Referring to FIGS. 1 to 5, the gate driver 300 may include a carry generation circuit ST that generates a carry signal GC_CR(n) based on a previous carry signal GC_CR(n-1), a first clock signal NCLK1, a second clock signal NCLK2, and a low gate voltage VGL having a relatively low level, and a masking circuit MC connected to the carry generation circuit ST.

The masking circuit MC may or may not output a gate pulse depending on the carry signal GC_CR(n), a first enable signal EN, and a second enable signal ENB.

In an embodiment, when the first enable signal EN has a high level H which is a relatively high level and the second enable signal ENB has a low level L which is a relatively low level, the masking circuit MC may output the gate pulse, for example.

In an embodiment, when the first enable signal EN has the low level L and the second enable signal ENB has the high level H, the masking circuit MC may not output the gate pulse, for example.

As shown in FIG. 4, the gate driver 300 may output the gate pulse at a relatively high frequency (e.g., 120 hertz (Hz)) for an area requiring a relatively high frequency driving among areas within the display panel 100 and at a relatively low frequency (e.g., 1 Hz) for an area requiring a relatively low frequency driving among the areas within the display panel 100 according to the first enable signal EN and the second enable signal ENB.

The masking circuit MC may mask an output of the gate pulse to output the gate pulse at a relatively low frequency (e.g., 1 Hz). Since the carry generation circuit ST transmits the carry signal to the subsequent stage regardless of the operation of the masking circuit MC to mask the output of the gate pulse, the gate driver 300 may support a multiple driving frequency division.

The masking circuit MC may include a first switching element S1 including a control electrode connected to a first masking control node S-node, a first electrode connected to a second control node QB, and a second electrode connected to a third control node QM, a ninth switching element S9 including a control electrode connected to a second masking control node SB-node, a first electrode to which the first clock signal NCLK1 is applied, and a second electrode connected to the third control node QM, a tenth switching element S10 including a control electrode to which the carry signal GC_CR(n) is applied, a first electrode to which a high gate voltage VGH having a relatively high level is applied, and a second electrode connected to a first intermediate node 1IN, an eleventh switching element S11 including a control electrode to which the second enable signal ENB is applied, a first electrode connected to the first intermediate node 1IN, and a second electrode connected to the second masking control node SB-node, a twelfth switching element S12 including a control electrode to which the first enable signal EN is applied, a first electrode connected to the second masking control node SB-node, and a second electrode connected to a second intermediate node 2IN, and a thirteenth switching element S13 including a control electrode to which the carry signal GC_CR(n) is applied, a first electrode connected to the second intermediate node 2IN, and a second electrode to which the low gate voltage VGL is applied.

The masking circuit MC may further include a second switching element S2 including a control electrode to which the carry signal GC_CR(n) is applied, a first electrode to which the high gate voltage VGH is applied, and a second electrode connected to a third intermediate node 3IN, a third switching element S3 including a control electrode to which the first enable signal EN is applied, a first electrode connected to the third intermediate node 3IN, and a second electrode connected to the first masking control node S-node, a fourth switching element S4 including a control electrode to which the second enable signal ENB is applied, a first electrode connected to the first masking control node S-node, and a second electrode connected to a fourth intermediate node 4IN, a fifth switching element S5 including a control electrode to which the carry signal GC_CR(n) is applied, a first electrode connected to the fourth intermediate node 4IN, and a second electrode to which the low gate voltage VGL is applied.

The masking circuit MC may further include a sixth switching element S6 including a control electrode connected to the third control node QM, a first electrode to which the first clock signal NCLK1 is applied, and a second electrode connected to a gate output node GON, a seventh switching element S7 including a control electrode connected to a first control node Q, a first electrode connected to the gate output node GON, and a second electrode to which the low gate voltage VGL is applied, and an eighth switching element S8 including a control electrode connected to the first control node Q, a first electrode to which the first clock signal NCLK1, and a second electrode connected to the third control node QM.

The masking circuit MC may further include a first masking capacitor CM1 including a first electrode to which the first clock signal NCLK1 is applied and a second electrode connected to the third control node QM, and a second masking capacitor CM2 including a first electrode connected to the first masking control node S-node and a second electrode to which the low gate voltage VGL is applied.

The carry generation circuit ST may include a first gate switching element T1 including a control electrode to which the first clock signal NCLK1 is applied, a first electrode to which the previous carry signal GC_CR(n-1) is applied, and a second electrode connected to a first node ND1, a second gate switching element T2 including a control electrode connected to the first control node Q, a first electrode to which the second clock signal NCLK2 is applied, and a second electrode connected to a fifth node ND5, a third gate switching element T3 including a control electrode to which the first clock signal NCLK1, a first electrode connected to a second node ND2, and a second electrode to which the low gate voltage VGL is applied, a fourth gate switching element T4 including a control electrode to which the low gate voltage VGL is applied, a first electrode connected to the second node ND2, and a second electrode connected to a third node ND3, a fifth gate switching element T5 including a control electrode connected to the first control node Q, a first electrode to which the first clock signal NCLK1 is applied, and a second electrode connected to the second node ND2, a sixth gate switching element T6 including a control electrode connected to the third node ND3, a first electrode to which the second clock signal NCLK2 is applied, and a second electrode connected to a fifth intermediate node 5IN, a seventh gate switching element T7 including a control electrode connected to the third node ND3, a first electrode connected to a fourth node ND4, and a second electrode connected to the fifth intermediate node 5IN, an eighth gate switching element T8 including a control electrode to which the second clock signal NCLK2 is applied, a first electrode connected to the fourth node ND4, and a second electrode connected to the second control node QB, a ninth gate switching element T9 including a control electrode connected to the second control node QB, a first electrode to which the first clock signal NCLK1 is applied, and a second electrode connected to a carry output node CON, a tenth gate switching element T10 including a control electrode connected to the first control node Q, a first electrode connected to the carry output node CON, and a second electrode to which the low gate voltage VGL is applied, an eleventh gate switching element T11 including a control electrode to which the low gate voltage VGL is applied, a first electrode connected to the first node ND1, and a second electrode connected to the first control node Q, and a fourteenth gate switching element T14 including a control electrode connected to the first control node Q, a first electrode to which the first clock signal NCLK1 is applied, and a second electrode connected to the second control node QB.

The carry generation circuit ST may further include a twelfth gate switching element T12 including a control electrode to which a reset signal SESR is applied, a first electrode to which the first clock signal NCLK1 is applied, and a second electrode connected to the first node ND1, and a thirteenth gate switching element T13 including a control electrode to which the reset signal SESR is applied, a first electrode connected to the second control node QB, and a second electrode to which the low gate voltage VGL is applied.

The carry generation circuit ST may further include a first capacitor C1 including a first electrode to which the first clock signal NCLK1 is applied and a second electrode connected to the second control node QB, a second capacitor C2 including a first electrode connected to the third node ND3 and a second electrode connected to the fourth node ND4, and a third capacitor C3 including a first electrode connected to the fifth node ND5 and a second electrode connected to the first control node Q.

In the illustrated embodiment, the previous carry signal GC_CR(n-1) may be a carry signal of the stage immediately preceding the current stage. However, the disclosure is not limited thereto, and the previous carry signal GC_CR(n-1) may be a carry signal from any one of the previous stages of the current stage.

In the illustrated embodiment, the first to thirteenth switching elements S1 to S13 and the first to fourteenth gate switching elements T1 to T14 may be polysilicon transistors. In the illustrated embodiment, the first to thirteenth switching elements S1 to S13 and the first to fourteenth gate switching elements T1 to T14 may be P-type transistors.

Figure 6:
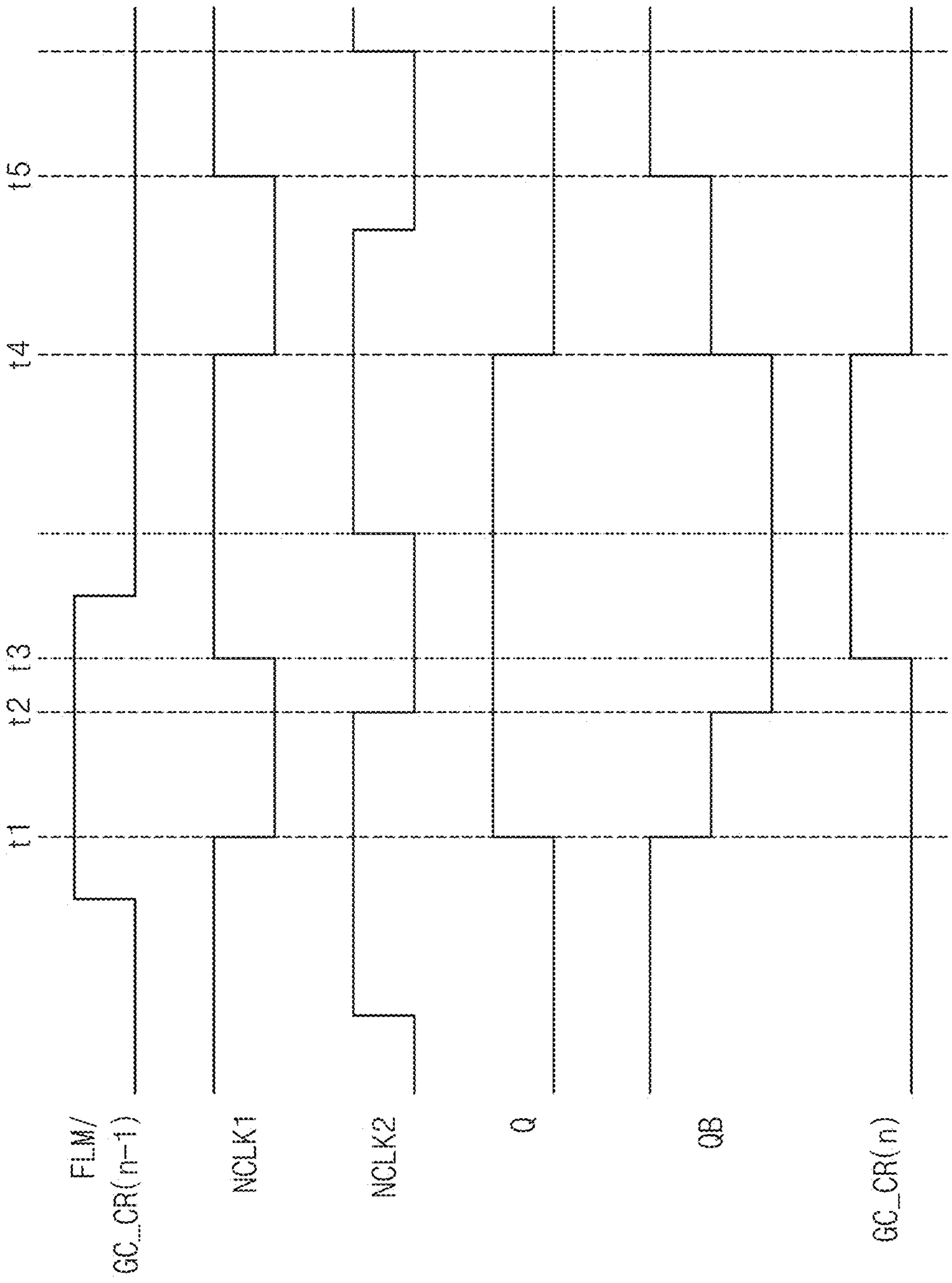
FIG. 6 is a timing diagram showing signals of the carry generation circuit of FIG. 5.

FIG. 6 is a timing diagram showing signals of the carry generation circuit ST of FIG. 5.

With reference to FIGS. 5 and 6, an operation of the carry generation circuit ST will be described.

Referring to FIGS. 5 and 6, at a first time point t1, the vertical start signal FLM or the previous carry signal GC_CR(n-1) may have an activation level (e.g., a relatively high level), and the first clock signal NCLK1 may have a relatively low level. At the first time point t1, the first control node Q may have the relatively high level. The first clock signal NCLK1 may be coupled through the first capacitor C1, so that the second control node QB may be changed to a first relatively low level. At the first time point t1, the third gate switching element T3 and the fourth gate switching element T4 may be turned on, and the second capacitor C2 may be charged.

At a second time point t2, the second clock signal NCLK2 may fall from the relatively high level to the relatively low level. At the second time point t2, the second control node QB may be changed to a second relatively low level due to a boosting of the second capacitor C2. At the second time point t2, the ninth gate switching element T9 may have a turn-on state, and since the first clock signal NCLK1 has the relatively low level, the carry signal GC_CR(n) may be output as the relatively low level. At the second time point t2, the first capacitor C1 may be charged to a level of the low gate voltage VGL.

At a third time point t3, the first clock signal NCLK1 may rise from the relatively low level to the relatively high level. When the first clock signal NCLK1 rises from the relatively low level to the relatively high level in the turn-on state of the ninth gate switching element T9, the carry signal GC_CR(n) may be output as the relatively high level.

At a fourth time point t4, the first clock signal NCLK1 may fall from the relatively high level to the relatively low level. When the first clock signal NCLK1 become the relatively low level, since the vertical start signal FLM or the previous carry signal GC_CR(n-1) has the relatively low level, the first control node Q may become the relatively low level. At the fourth time point t4, when the first control node Q becomes the relatively low level, the tenth gate switching element T10 may be turned-on, and the level of the relatively low gate voltage VGL may be output as the carry signal GC_CR(n) through the tenth gate switching element T10. Further, at the fourth time point t4, the first control node Q may turn-on the fourteenth gate switching element T14, and the first clock signal NCLK1 having the relatively low level may turn on the ninth gate switching element T9, so that a falling edge of the first clock signal NCLK1 may be output as the carry signal GC_CR(n).

At a fifth time point t5, the first clock signal NCLK1 may rise from the relatively low level to the relatively high level. At the fifth time point t5, when the first clock signal NCLK1 rises from the relatively low level to the relatively high level, the first control node Q may maintain the relatively low level. The relatively low level of the first control node Q may turn on the tenth gate switching element T10, and the level of the relatively low gate voltage VGL may be output as the carry signal GC_CR(n) through the tenth gate switching element T10. Further, at the fifth time point t5, the relatively low level of the first control node Q may turn on the fourteenth gate switching element T14, and the second control node QB may have the relatively high level at a rising edge of the first clock signal NCLK1 by the fourteenth gate switching element T14.

When the reset signal SESR is applied, the twelfth gate switching element T12 and the thirteenth gate switching element T13 may be turned on, the first control node Q may be initialized by the twelfth gate switching element T12, and the second control node QB may be initialized by the thirteenth gate switching element T13. When the reset signal SESR is applied, the gate driver 300 may output the gate signal GC (n) having the relatively high level.

Figure 7:
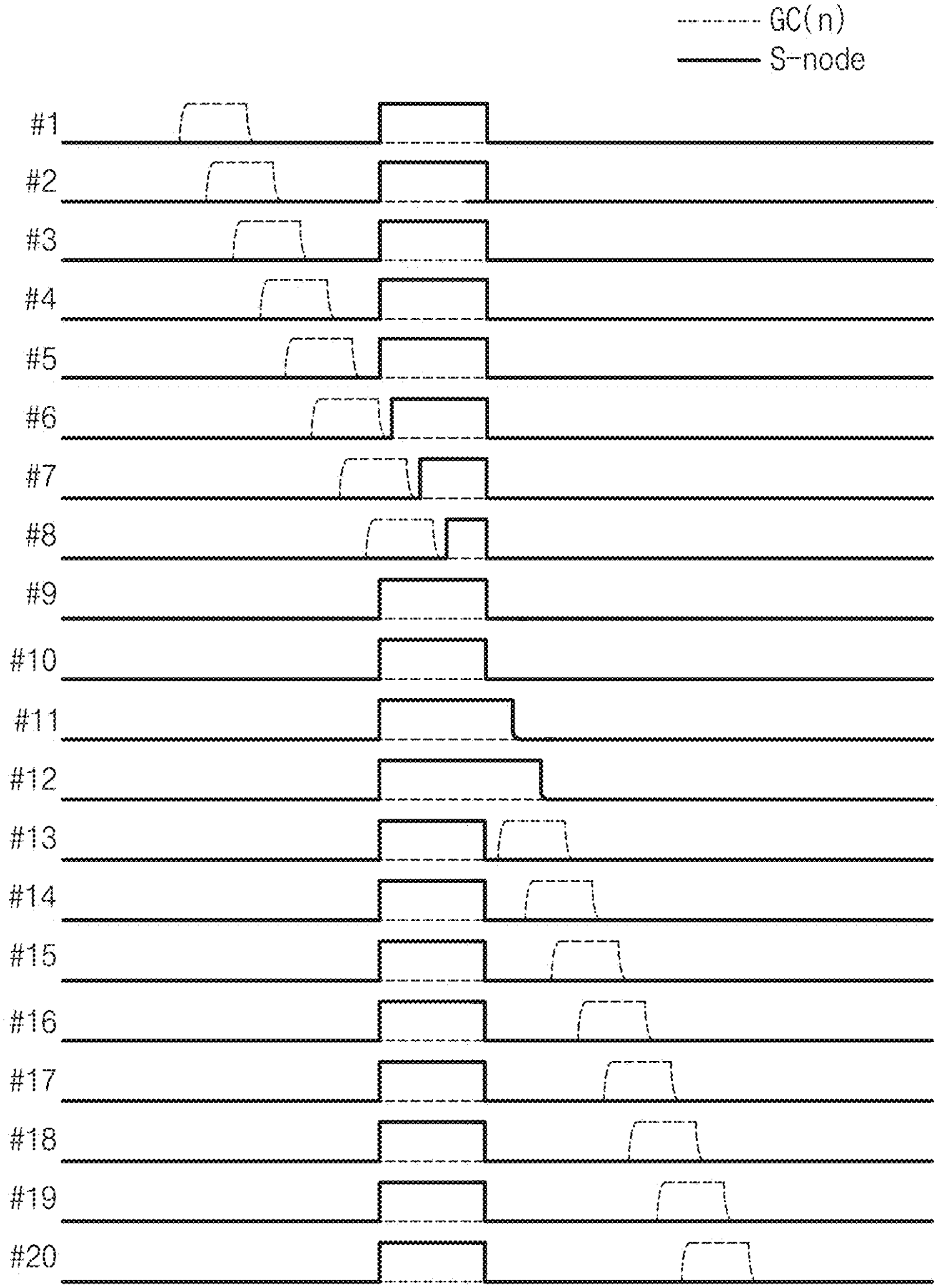
FIG. 7 is a timing diagram showing a signal of a first masking control node and a gate signal of the masking circuit of FIG. 5.
Figure 8:
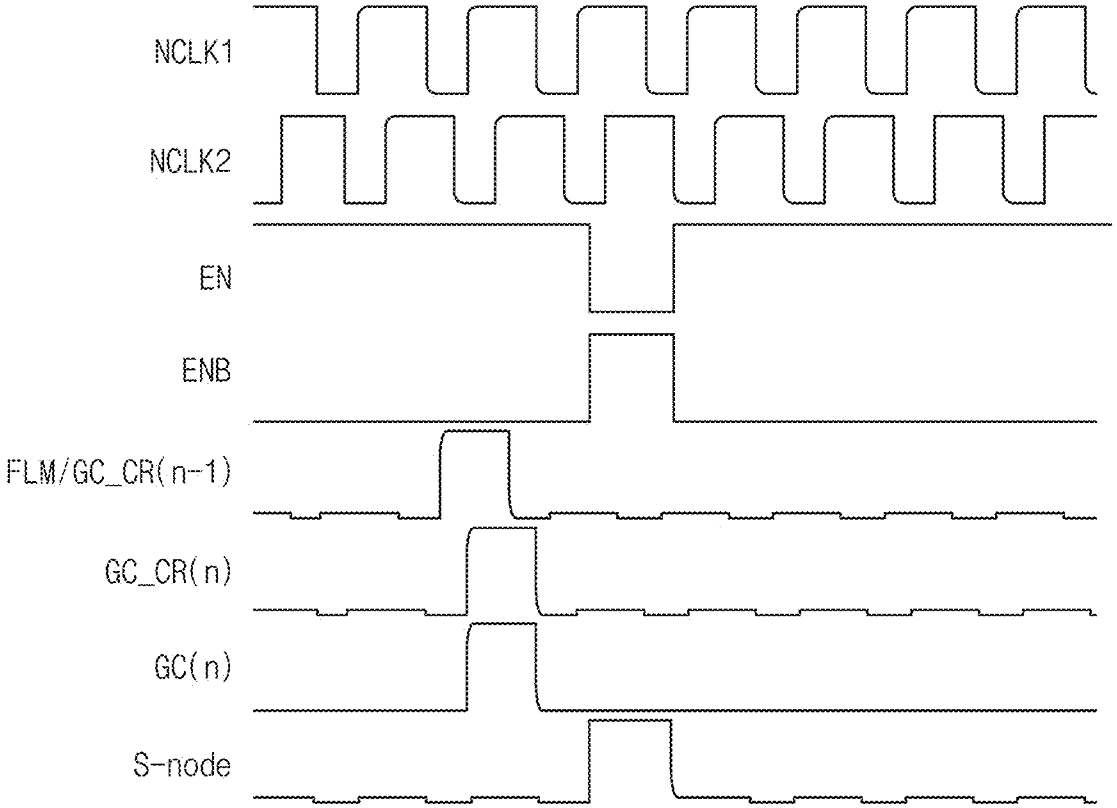
FIG. 8 is a timing diagram showing signals of the carry generation circuit and the masking circuit of FIG. 5 in a first case.
Figure 9:
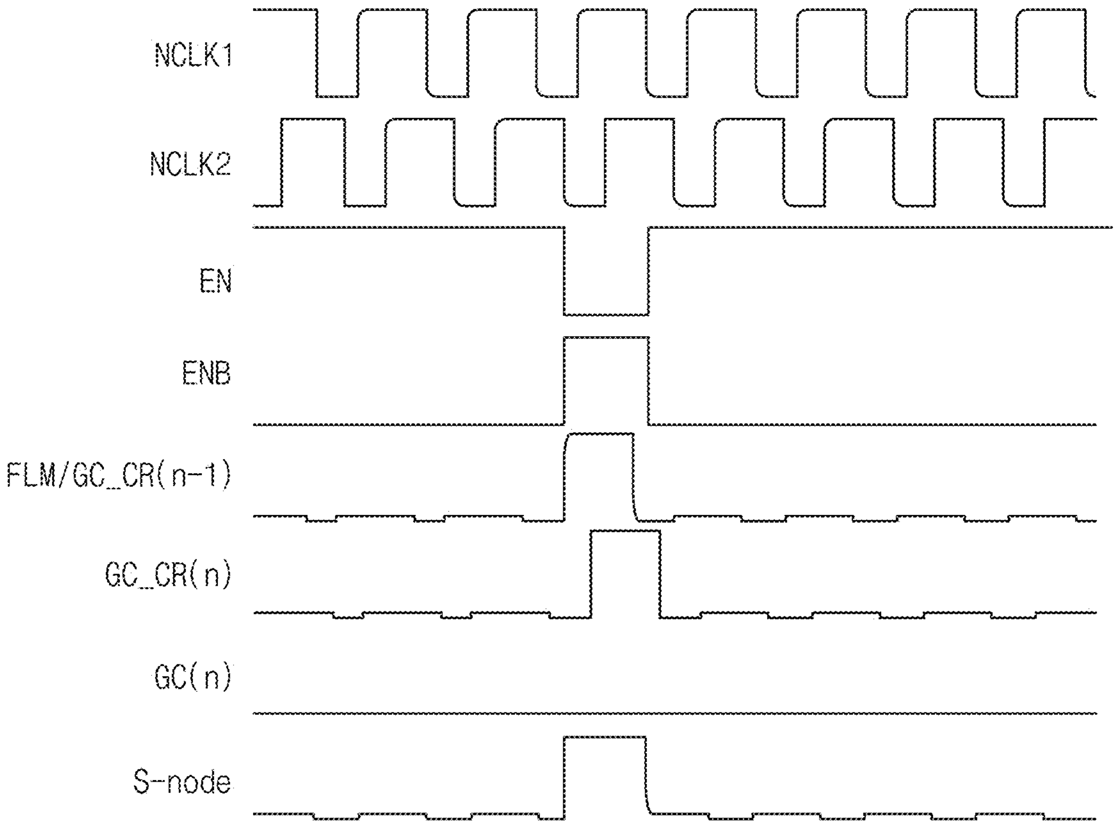
FIG. 9 is a timing diagram showing signals of the carry generation circuit and the masking circuit of FIG. 5 in a second case.
Figure 10:
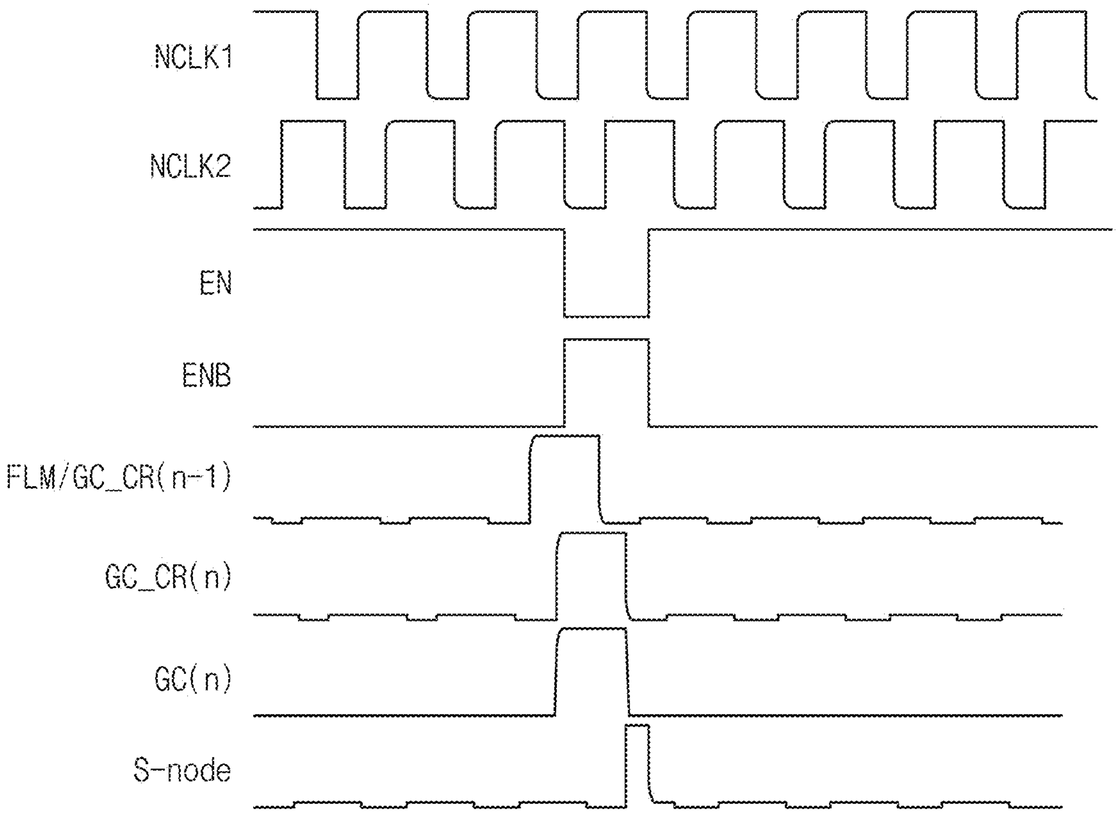
FIG. 10 is a timing diagram showing signals of the carry generation circuit and the masking circuit of FIG. 5 in a third case.
Figure 11:
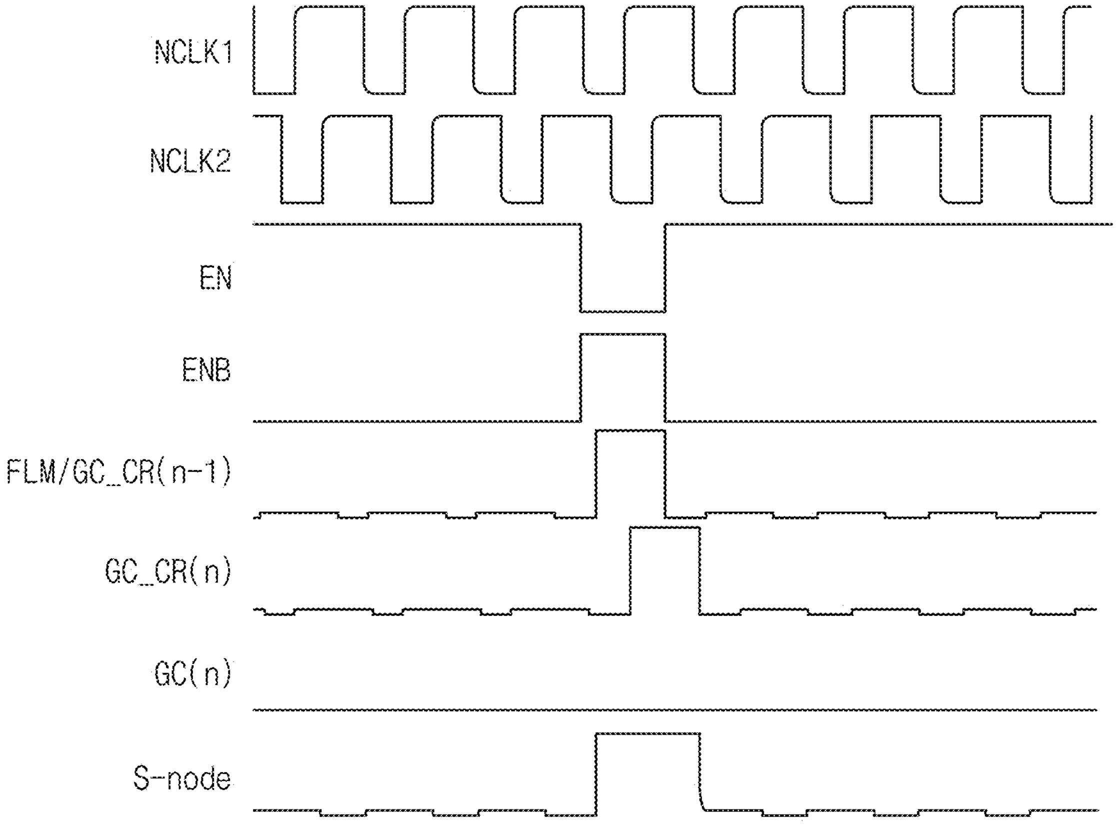
FIG. 11 is a timing diagram showing signals of the carry generation circuit and the masking circuit of FIG. 5 in a fourth case.

FIG. 7 is a timing diagram showing a signal of the first masking control node S-node and the gate signal GC (n) of the masking circuit MC of FIG. 5. FIG. 8 is a timing diagram showing signals of the carry generation circuit ST and the masking circuit MC of FIG. 5 in a first case. FIG. 9 is a timing diagram showing signals of the carry generation circuit ST and the masking circuit MC of FIG. 5 in a second case. FIG. 10 is a timing diagram showing signals of the carry generation circuit ST and the masking circuit MC of FIG. 5 in a third case. FIG. 11 is a timing diagram showing signals of the carry generation circuit ST and the masking circuit MC of FIG. 5 in a fourth case.

With reference to FIGS. 5 and 7 to 11, an operation of the masking circuit MC will be described.

For a multiple division operation, the gate driver 300 may use an output of the carry generation circuit ST as the carry signal GC_CR(n), and may use an output of the masking circuit MC as the gate signal GC (n).

The masking circuit MC may be connected to the carry generation circuit ST through the first control node Q, the second control node QB, and the carry output node CON from which the carry signal (e.g., GC_CR(n)) is output. According to the first enable signal EN and the second enable signal ENB, states of the first masking control node S-node and the first switching element S1 may change, and the masking circuit MC may operate.

FIG. 7 exemplary shows a case where gate pulses are not output from ninth to twelfth gate lines #9- #12 among 20 gate lines #1- #20 due to a masking operation. First to eighth gate lines #1- #8 and thirteenth to twentieth gate lines #13- #20 may output the gate pulses. The ninth to twelfth gate lines #9- #12 may not output the gate pulses.

In the gate line where the gate pulse is not output, the first masking control node S-node may maintain the relatively high level, and when the first masking control node S-node maintains the relatively high level, the first switching element S1 may be turned off, so that the sixth switching element S6 may be turned off, and the gate pulse may not be output from the gate output node GON.

The sixth switching element S6 may operate similarly to the ninth gate switching element T9 of the carry generation circuit ST. The ninth gate switching element T9 may output the first clock signal NCLK1 as the carry signal GC_CR(n) in response to a signal of the second control node QB. The sixth switching element S6 may output the first clock signal NCLK1 as the gate signal GC (n) in response to a signal of the third control node QM.

The seventh switching element S7 may operate similarly to the tenth gate switching element T10 of the carry generation circuit ST. The tenth gate switching element T10 may output the low gate voltage VGL as the relatively low level of the carry signal GC_CR(n) in response to a signal of the first control node Q. The seventh switching element S7 may output the low gate voltage VGL as the relatively low level of the gate signal GC (n) in response to the signal of the first control node Q.

The eighth switching element S8 may operate similarly to the fourteenth gate switching element T14 of the carry generation circuit ST. The fourteenth gate switching element T14 may output the first clock signal NCLK1 to the second control node QB in response to the signal of the first control node Q. The eighth switching element S8 may output the first clock signal NCLK1 to the third control node QM in response to the signal of the first control node Q.

A signal of the first masking control node S-node may be determined by operations of the second to fifth switching elements S2-S5.

In an embodiment, when the carry signal GC_CR(n) has the relatively low level and the first enable signal EN has the relatively low level, the second switching element S2 and the third switching element S3 may be turned on, so that the high gate voltage VGH may be applied to the first masking control node S-node, for example. The second enable signal ENB may be an inverted signal of the first enable signal EN. Accordingly, when the third switching element S3 is turned on by the first enable signal EN, the fourth switching element S4 may be turned off by the second enable signal ENB.

In an embodiment, when the carry signal GC_CR(n) has the relatively low level and the second enable signal ENB has the relatively low level, the fourth switching element S4 and the fifth switching element S5 may be turned on, so that the low gate voltage VGL may be applied to the first masking control node S-node, for example. When the fourth switching element S4 is turned on by the second enable signal ENB, the third switching element S3 may be turned off by the first enable signal EN.

In an embodiment, when the carry signal GC_CR(n) has the relatively high level, the second switching element S2 and the fifth switching element S5 may be turned off, so that the first masking control node S-node may maintain the previous state regardless of toggles of the first enable signal EN and the second enable signal ENB, for example.

FIG. 8 exemplary shows a case where the first enable signal EN has an inactivation level (e.g., the relatively high level) during an entirety of the period in which the carry signal GC_CR(n) has the activation level (e.g., the relatively high level). When the first enable signal EN has the inactivation level during the entirety of the period in which the carry signal GC_CR(n) has the activation level, the masking circuit MC (refer to FIG. 5) may output the gate pulse.

FIG. 9 exemplary shows a case where the first enable signal EN has the activation level (e.g., the relatively low level) during an entirety of the period in which the carry signal GC_CR(n) has the activation level (e.g., the relatively high level). When the first enable signal EN has the activation level during the entirety of the period in which the carry signal GC_CR(n) has the activation level, the masking circuit MC (refer to FIG. 5) may not output the gate pulse.

FIG. 10 exemplary shows a case where the first enable signal EN changes from the inactivation level (e.g., the relatively high level) to the activation level (e.g., the relatively low level) during a period in which the carry signal GC_CR(n) has the activation level (e.g., the relatively high level). When the first enable signal EN changes from the inactivation level to the activation level during the period in which the carry signal GC_CR(n) has the activation level, the masking circuit MC may output the gate pulse.

FIG. 11 exemplary shows a case where the first enable signal EN changes from the activation level (e.g., the relatively low level) to the inactivation level (e.g., the relatively high level) during the period in which the carry signal GC_CR(n) has the activation level (e.g., the relatively high level). When the first enable signal EN changes from the activation level to the inactivation level during the period in which the carry signal GC_CR(n) has the activation level, the masking circuit MC may not output the gate pulse.

To summarize the operations of FIGS. 8 to 11, when the first enable signal EN has the inactivation level (e.g., the relatively high level) at a rising edge of the carry signal GC_CR(n), the masking circuit MC may output the gate pulse. When the first enable signal EN has the activation level (e.g., the relatively low level) at the rising edge of the carry signal GC_CR(n), the masking circuit MC may not output the gate pulse.

Figure 12:
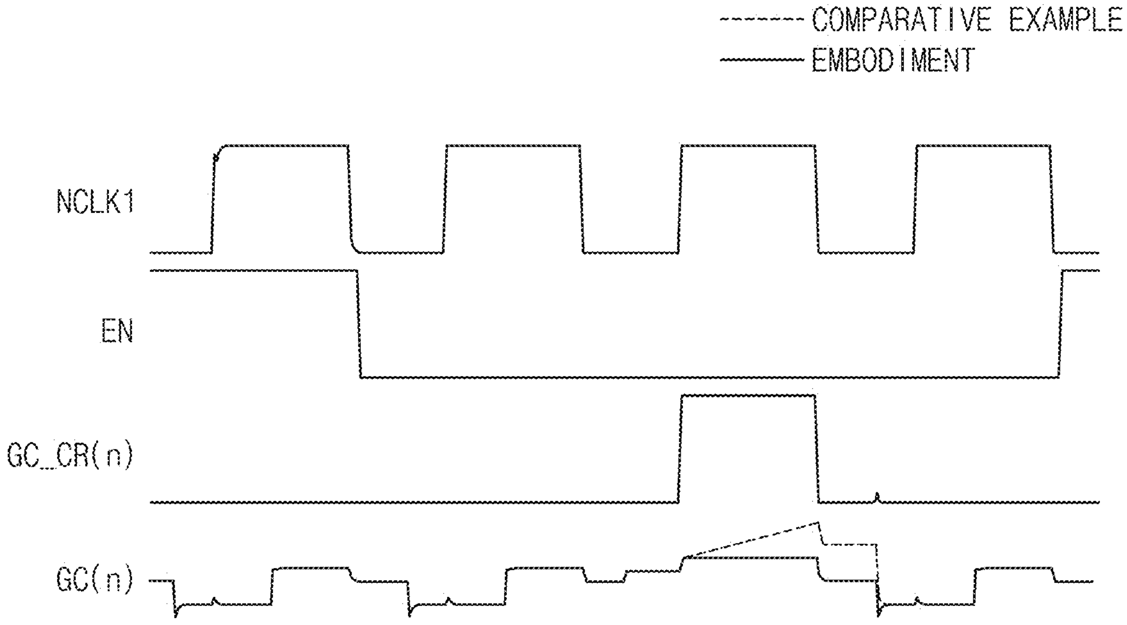
FIG. 12 is a timing diagram showing a gate signal according to a comparative example and an embodiment.

FIG. 12 is a timing diagram showing a gate signal GC (n) according to a comparative example and an embodiment.

Referring to FIGS. 5 and 12, a state of the second masking control node SB-node changes according to the first enable signal EN and the second enable signal ENB, and a state of the third control node QM may change. When the second masking control node SB-node has the relatively low level, the ninth switching element S9 may be turned on, and the first clock signal NCLK1 may be applied to the third control node QM The signal of the second masking control node SB-node may be determined by operations of the tenth to thirteenth switching elements S10-S13.

In an embodiment, when the carry signal GC_CR(n) has the relatively low level and the second enable signal ENB has the relatively low level, the tenth switching element S10 and the eleventh switching element S11 may be turned on, so that the high gate voltage VGH may be applied to the second masking control node SB-node, for example. When the eleventh switching element S11 is turned on by the second enable signal ENB, the twelfth switching element S12 may be turned off by the first enable signal EN.

In an embodiment, when the carry signal GC_CR(n) has the relatively low level and the first enable signal EN has the relatively low level, the twelfth switching element S12 and the thirteenth switching element S13 may be turned on, so that the low gate voltage VGL may be applied to the second masking control node SB-node, for example. When the twelfth switching element S12 is turned on by the first enable signal EN, the eleventh switching element S11 may be turned off by the second enable signal ENB.

In an embodiment, when the carry signal GC_CR(n) has the relatively high level, the tenth switching element S10 and the thirteenth switching element S13 may be turned off, so that the second masking control node SB-node may maintain the previous state regardless of the toggles of the first enable signal EN and the second enable signal ENB, for example.

FIG. 12 exemplary shows a case where the carry signal GC_CR(n) changes from the inactivation level (e.g., the relatively low level) to the activation level (e.g., the relatively low level) during the period in which the first enable signal EN has the activation level (e.g., the relatively low level). When the carry signal GC_CR(n) changes from the inactivation level to the activation level during the period in which the first enable signal EN has the activation level, the first clock signal NCLK1 having the relatively high level may be applied to the third control node QM.

In a comparative example in which the masking circuit MC does not include the ninth to thirteenth switching elements S9-S13, when the carry signal GC_CR(n) changes from the inactivation level to the activation level during the period in which the first enable signal EN has the activation level, the first masking control node S-node may have the high gate voltage VGH in the previous state, and the first switching element S1 may be turned off. Accordingly, while the third control node QM is floated, the third control node QM may maintain the relatively high level of the second control node QB in the previous state. In this case, the change in the first clock signal NCLK1 coupled to the third control node QM by a capacitance of the sixth switching element S6, a capacitance of the first masking capacitor CM1, etc. may affect the floated third control node QM, so that a ripple of the gate signal GC (n) may occur. In an embodiment, when the carry signal GC_CR(n) changes from the inactivation level to the activation level during the period in which the first enable signal EN has the activation level, a level of the signal of the third control node QM may decrease, for example. Accordingly, the sixth switching element S6 may be turned on, thereby generating a ripple that increases a level of the gate signal GC (n) as shown in FIG. 12.

In the illustrated embodiment in which the masking circuit MC includes the ninth to thirteenth switching elements S9-S13, when the carry signal GC_CR(n) changes from the inactivation level to the activation level during the period in which the first enable signal EN has the activation level, the second masking control node SB-node may have the low gate voltage VGL in the previous state, and the ninth switching element S9 may be turned on. Accordingly, the first clock signal NCLK1 having the relatively high level may be applied to the third control node QM through the ninth switching element S9. In this case, the sixth switching element S6 may be turned off, so that the gate signal GC (n) may not increase, and the gate signal GC (n) may maintain the relatively low level as shown in FIG. 12. Accordingly, the ninth to thirteenth switching elements S9-S13 may prevent the ripple of the gate signal GC (n) from occurring.

Figure 13:
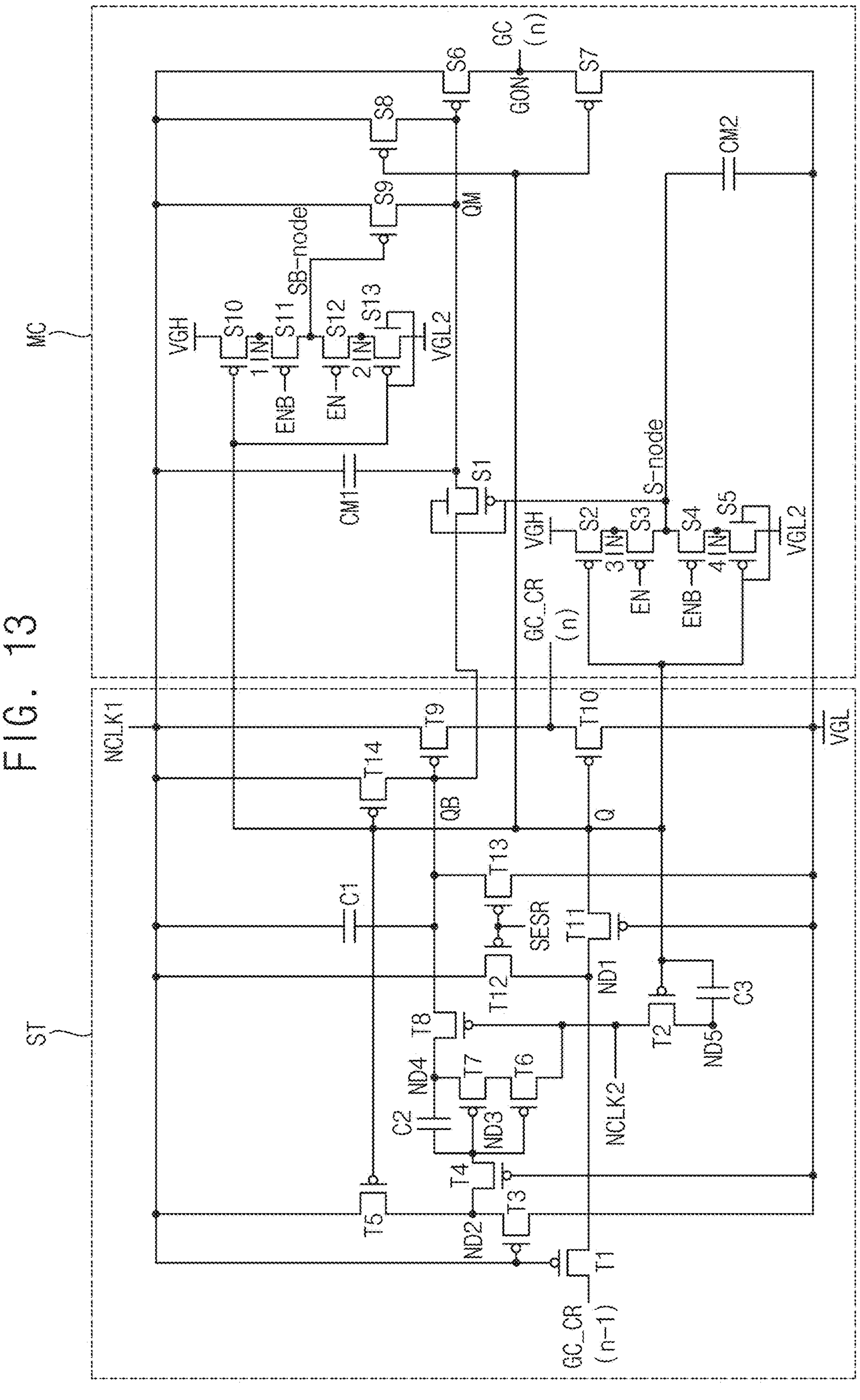
FIG. 13 is a circuit diagram showing an embodiment of a carry generation circuit and a masking circuit.

FIG. 13 is a circuit diagram showing an embodiment of a carry generation circuit ST and a masking circuit MC.

Descriptions of components of the masking circuit MC described with reference to FIG. 13, which are substantially the same as or similar to those of the masking circuit MC described with reference to FIGS. 5 to 12, will be omitted.

Referring to FIG. 13, a masking circuit MC may output or may not output the gate pulse according to a signal of a first control node Q, a first enable signal EN, and a second enable signal ENB.

The masking circuit MC may include a first switching element S1 including a control electrode connected to a first masking control node S-node, a first electrode connected to a second control node QB, and a second electrode connected to a third control node QM, a ninth switching element S9 including a control electrode connected to a second masking control node SB-node, a first electrode to which the first clock signal NCLK1 is applied, and a second electrode connected to the third control node QM, a tenth switching element S10 including a control electrode connected to the first control node Q, a first electrode to which the high gate voltage VGH is applied, and a second electrode connected to a first intermediate node 1IN, an eleventh switching element S11 including a control electrode to which the second enable signal ENB is applied, a first electrode connected to the first intermediate node 1IN, and a second electrode connected to the second masking control node SB-node, a twelfth switching element S12 including a control electrode to which the first enable signal EN is applied, a first electrode connected to the second masking control node SB-node, and a second electrode connected to a second intermediate node 2IN, and a thirteenth switching element S13 including a control electrode connected to the first control node Q, a first electrode connected to the second intermediate node 2IN, and a second electrode to which a second low gate voltage VGL2 is applied. A level of the second low gate voltage VGL2 may be lower than a level of the low gate voltage VGL.

The masking circuit MC may further include a second switching element S2 including a control electrode connected to the first control node Q, a first electrode to which the high gate voltage VGH is applied, and a second electrode connected to a third intermediate node 3IN, a third switching element S3 including a control electrode to which the first enable signal EN is applied, a first electrode connected to the third intermediate node 3IN, and a second electrode connected to the first masking control node S-node, a fourth switching element S4 including a control electrode to which the second enable signal ENB is applied, a first electrode connected to the first masking control node S-node, and a second electrode connected to a fourth intermediate node 4IN, a fifth switching element S5 including a control electrode connected to the first control node Q, a first electrode connected to the fourth intermediate node 4IN, and a second electrode to which the second low gate voltage VGL2 is applied.

The masking circuit MC may further include a sixth switching element S6 including a control electrode connected to the third control node QM, a first electrode to which the first clock signal NCLK1 is applied, and a second electrode connected to a gate output node GON, a seventh switching element S7 including a control electrode connected to the first control node Q, a first electrode connected to the gate output node GON, and a second electrode to which the low gate voltage VGL is applied, and an eighth switching element S8 including a control electrode connected to the first control node Q, a first electrode to which the first clock signal NCLK1, and a second electrode connected to the third control node QM.

The masking circuit MC may include a first masking capacitor CM1 including a first electrode to which the first clock signal NCLK1 is applied and a second electrode connected to the third control node QM, and a second masking capacitor CM2 including a first electrode connected to the first masking control node S-node and a second electrode to which the low gate voltage VGL is applied.

Figure 14:
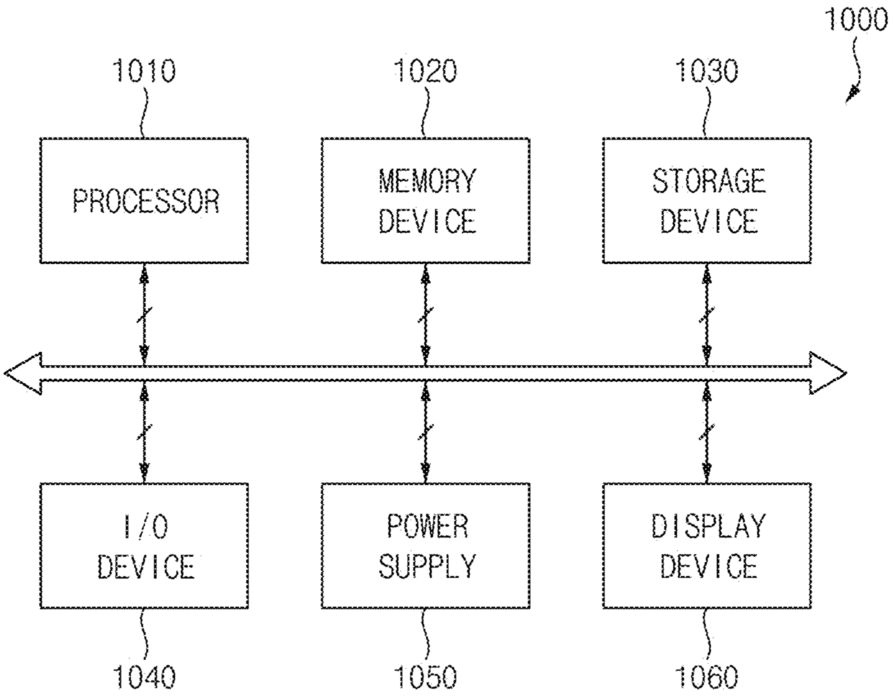
FIG. 14 is a block diagram showing an embodiment of an electronic apparatus.
Figure 15:
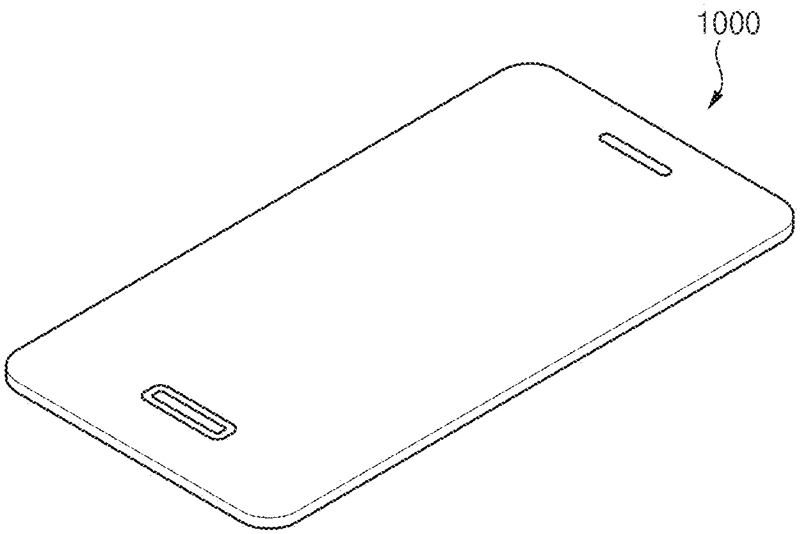
FIG. 15 is a view showing an embodiment in which the electronic apparatus of FIG. 14 is implemented as a smart phone.

FIG. 14 is a block diagram showing an embodiment of an electronic apparatus 1000. FIG. 15 is a view showing an embodiment in which the electronic apparatus 1000 of FIG. 14 is implemented as a smart phone.

Referring to FIGS. 14 and 15, an electronic apparatus 1000 may include a processor 1010, a memory device 1020, a storage device 1030, an input/output ("I/O") device 1040, a power supply 1050, and a display device 1060. The electronic apparatus 1000 may further include a plurality of ports capable of communicating with a video card, a sound card, a memory card, a universal serial bus ("USB") device, or the like, or communicating with other systems.

In an embodiment, as shown in FIG. 15, the electronic apparatus 1000 may be implemented as a smart phone. However, the disclosure is not limited thereto, and in another embodiment, the electronic apparatus 1000 may be implemented as a television, a mobile phone, a video phone, a smart pad, a smart watch, a tablet PC, a vehicle navigation, a laptop computer, a head-mounted display, or the like.

The processor 1010 may perform predetermined calculations or tasks. In an embodiment, the processor 1010 may be a microprocessor, a central processing unit ("CPU"), or the like. The processor 1010 may be connected to other components through an address bus, a control bus, a data bus, or the like. In an embodiment, the processor 1010 may also be connected to an expansion bus such as a peripheral component interconnect ("PCI") bus. In an embodiment, the processor 1010 may provide the input image data (IMG of FIG. 1) and the control signal (CONT of FIG. 1) to the display device 1060.

The memory device 1020 may store data desired for an operation of the electronic apparatus 1000. In an embodiment, the memory device 1020 may include: a nonvolatile memory device such as an erasable programmable read-only memory ("EPROM"), an electrically erasable programmable read-only memory ("EEPROM"), a flash memory, a phase change random access memory ("PRAM"), a resistance random access memory ("RRAM"), a nano floating gate memory ("NFGM"), a polymer random access memory ("PoRAM"), a magnetic random access memory ("MRAM"), or a ferroelectric random access memory ("FRAM"); and/or a volatile memory device such as a dynamic random access memory ("DRAM"), a static random access memory ("SRAM"), or a mobile DRAM, for example.

The storage device 1030 may include a solid state drive ("SSD"), a hard disk drive ("HDD"), a compact disc read-only memory ("CD-ROM"), or the like. The I/O device 1040 may include: an input device such as a keyboard, a keypad, a touch pad, a touch screen, or a mouse; and an output device such as a speaker or a printer. The power supply 1050 may supply a power desired for the operation of the electronic apparatus 1000. The display device 1060 may be connected to other components through the buses or other communication links. The display device 1060 may correspond to the display device 10 of FIG. 1.

The display device in the embodiments may be applied to a display device included in a computer, a notebook, a mobile phone, a smart phone, a smart pad, a smart watch, a MP3 portable media player ("PMP"), a personal digital assistance ("PDA"), a motion pictures expert group audio layer III ("MP3") player, or the like.

Although the masking circuits, the gate drivers, and the display devices in the embodiments have been described with reference to the drawings, the illustrated embodiments are examples, and may be modified and changed by a person having ordinary knowledge in the relevant technical field without departing from the technical spirit described in the following claims.

What is claimed is:

1. A masking circuit comprising:
- a first switching element including:
  - a control electrode connected to a first masking control node;
  - a first electrode connected to a second control node; and
  - a second electrode connected to a third control node;
- a ninth switching element including:
  - a control electrode connected to a second masking control node;
  - a first electrode which receives a first clock signal; and
  - a second electrode connected to the third control node;
- a tenth switching element including:
  - a control electrode which receives a carry signal;
  - a first electrode which receives a high gate voltage having a relatively high level; and
  - a second electrode connected to a first intermediate node;
- an eleventh switching element including:
  - a control electrode which receives a second enable signal;
  - a first electrode connected to the first intermediate node; and
  - a second electrode connected to the second masking control node;
- a twelfth switching element including:
  - a control electrode which receives a first enable signal;
  - a first electrode connected to the second masking control node; and
  - a second electrode connected to a second intermediate node; and
- a thirteenth switching element including:
  - a control electrode which receives the carry signal;
  - a first electrode connected to the second intermediate node; and
  - a second electrode which receives a low gate voltage having a relatively low level.

2. The masking circuit of claim 1, wherein the first clock signal having a relatively high level is applied to the third control node when the carry signal changes from an inactivation level to an activation level during a period in which the first enable signal has an activation level.

3. The masking circuit of claim 1, further comprising:

a second switching element including a control electrode which receives the carry signal, a first electrode which receives the high gate voltage, and a second electrode connected to a third intermediate node;

a third switching element including a control electrode which receives the first enable signal, a first electrode connected to the third intermediate node, and a second electrode connected to the first masking control node;

a fourth switching element including a control electrode which receives the second enable signal, a first electrode connected to the first masking control node, and a second electrode connected to a fourth intermediate node; and a fifth switching element including a control electrode which receives the carry signal, a first electrode connected to the fourth intermediate node, and a second electrode which receives the low gate voltage.

4. The masking circuit of claim 3, further comprising:

a sixth switching element including a control electrode connected to the third control node, a first electrode which receives the first clock signal, and a second electrode connected to a gate output node;

a seventh switching element including a control electrode connected to a first control node, a first electrode connected to the gate output node, and a second electrode which receives the low gate voltage; and an eighth switching element including a control electrode connected to the first control node, a first electrode which receives the first clock signal, and a second electrode connected to the third control node.

5. The masking circuit of claim 4, wherein the first to thirteenth switching elements are P-type transistors.

6. The masking circuit of claim 4, further comprising:

a first masking capacitor including a first electrode which receives the first clock signal and a second electrode connected to the third control node; and a second masking capacitor including a first electrode connected to the first masking control node and a second electrode which receives the low gate voltage.

7. The masking circuit of claim 3, wherein a gate pulse is output from a gate output node when the first enable signal has an inactivation level during an entirety of a period in which the carry signal has an activation level, or the first enable signal changes from the inactivation level to an activation level while the carry signal has the activation level.

8. The masking circuit of claim 3, wherein a gate pulse is not output from a gate output node when the first enable signal has an activation level during an entirety of a period in which the carry signal has an activation level, or the first enable signal changes from the activation level to an inactivation level while the carry signal has the activation level.

9. A gate driver comprising:

a carry generation circuit which generates a carry signal based on a previous carry signal, a first clock signal, a second clock signal, and a low gate voltage having a relatively low level; and a masking circuit connected to the carry generation circuit, the masking circuit including:

a first switching element including a control electrode connected to a first masking control node, a first electrode connected to a second control node, and a second electrode connected to a third control node;

a ninth switching element including a control electrode connected to a second masking control node, a first electrode which receives the first clock signal, and a second electrode connected to the third control node;

a tenth switching element including a control electrode which receives the carry signal, a first electrode which receives a high gate voltage having a relatively high level, and a second electrode connected to a first intermediate node;

an eleventh switching element including a control electrode which receives a second enable signal, a first electrode connected to the first intermediate node, and a second electrode connected to the second masking control node;

a twelfth switching element including a control electrode which receives a first enable signal, a first electrode connected to the second masking control node, and a second electrode connected to a second intermediate node; and a thirteenth switching element including a control electrode which receives the carry signal, a first electrode connected to the second intermediate node, and a second electrode which receives the low gate voltage.

10. The gate driver of claim 9, wherein the first clock signal having a relatively high level is applied to the third control node when the carry signal changes from an inactivation level to an activation level during a period in which the first enable signal has an activation level.

11. The gate driver of claim 9, wherein the masking circuit further includes:

a second switching element including a control electrode which receives the carry signal, a first electrode which receives the high gate voltage, and a second electrode connected to a third intermediate node;

a third switching element including a control electrode which receives the first enable signal, a first electrode connected to the third intermediate node, and a second electrode connected to the first masking control node;

a fourth switching element including a control electrode which receives the second enable signal, a first electrode connected to the first masking control node, and a second electrode connected to a fourth intermediate node; and a fifth switching element including a control electrode which receives the carry signal, a first electrode connected to the fourth intermediate node, and a second electrode which receives the low gate voltage.

12. The gate driver of claim 11, wherein the masking circuit further includes:

a sixth switching element including a control electrode connected to the third control node, a first electrode which receives the first clock signal, and a second electrode connected to a gate output node;

a seventh switching element including a control electrode connected to a first control node, a first electrode connected to the gate output node, and a second electrode which receives the low gate voltage; and an eighth switching element including a control electrode connected to the first control node, a first electrode which receives the first clock signal, and a second electrode connected to the third control node.

13. The gate driver of claim 12, wherein the masking circuit further includes:

a first masking capacitor including a first electrode which receives the first clock signal and a second electrode connected to the third control node; and a second masking capacitor including a first electrode connected to the first masking control node and a second electrode which receives the low gate voltage.

14. The gate driver of claim 9, wherein the carry generation circuit includes:

a first gate switching element including a control electrode which receives the first clock signal, a first electrode which receives the previous carry signal, and a second electrode connected to a first node;

a second gate switching element including a control electrode connected to a first control node, a first electrode which receives the second clock signal, and a second electrode connected to a fifth node;

a third gate switching element including a control electrode which receives the first clock signal, a first electrode connected to a second node, and a second electrode which receives the low gate voltage;

a fourth gate switching element including a control electrode which receives the low gate voltage, a first electrode connected to the second node, and a second electrode connected to a third node;

a fifth gate switching element including a control electrode connected to the first control node, a first electrode which receives the first clock signal, and a second electrode connected to the second node;

a sixth gate switching element including a control electrode connected to the third node, a first electrode which receives the second clock signal, and a second electrode connected to a fifth intermediate node;

a seventh gate switching element including a control electrode connected to the third node, a first electrode connected to a fourth node, and a second electrode connected to the fifth intermediate node;

an eighth gate switching element including a control electrode which receives the second clock signal, a first electrode connected to the fourth node, and a second electrode connected to the second control node;

a ninth gate switching element including a control electrode connected to the second control node, a first electrode which receives the first clock signal, and a second electrode connected to a carry output node;

a tenth gate switching element including a control electrode connected to the first control node, a first electrode connected to the carry output node, and a second electrode which receives the low gate voltage;

an eleventh gate switching element including a control electrode which receives the low gate voltage, a first electrode connected to the first node, and a second electrode connected to the first control node; and a fourteenth gate switching element including a control electrode connected to the first control node, a first electrode which receives the first clock signal, and a second electrode connected to the second control node.

15. The gate driver of claim 14, wherein the carry generation circuit further includes:

a twelfth gate switching element including a control electrode which receives a reset signal, a first electrode which receives the first clock signal, and a second electrode connected to the first node; and a thirteenth gate switching element including a control electrode which receives the reset signal, a first electrode connected to the second control node, and a second electrode which receives the low gate voltage.

16. The gate driver of claim 14, wherein the carry generation circuit further includes:

a first capacitor including a first electrode which receives the first clock signal and a second electrode connected to the second control node;

a second capacitor including a first electrode connected to the third node and a second electrode connected to the fourth node; and a third capacitor including a first electrode connected to the fifth node and a second electrode connected to the first control node.

17. A display device comprising:

a display panel including a pixel including a first type switching element and a second type switching element different from the first type switching element;

a gate driver which outputs a gate signal to the display panel, the gate driver including:

a carry generation circuit which generates a carry signal based on a previous carry signal, a first clock signal, a second clock signal, and a low gate voltage having a relatively low level; and a masking circuit connected to the carry generation circuit, and wherein the masking circuit includes:

a first switching element including a control electrode connected to a first masking control node, a first electrode connected to a second control node, and a second electrode connected to a third control node;

a ninth switching element including a control electrode connected to a second masking control node, a first electrode which receives the first clock signal, and a second electrode connected to the third control node;

a tenth switching element including a control electrode which receives the carry signal, a first electrode which receives a high gate voltage having a relatively high level, and a second electrode connected to a first intermediate node;

an eleventh switching element including a control electrode which receives a second enable signal, a first electrode connected to the first intermediate node, and a second electrode connected to the second masking control node;

a twelfth switching element including a control electrode which receives a first enable signal, a first electrode connected to the second masking control node, and a second electrode connected to a second intermediate node; and a thirteenth switching element including a control electrode which receives the carry signal, a first electrode connected to the second intermediate node, and a second electrode which receives the low gate voltage; and a data driver which outputs a data voltage to the display panel.

18. The display device of claim 17, wherein the pixel includes:

a first pixel switching element including a control electrode connected to a first pixel node, a first electrode connected to a second pixel node, and a second electrode connected to a third pixel node;

a second pixel switching element including a control electrode which receives a data write gate signal, a first electrode which receives the data voltage, and a second electrode connected to the second pixel node;

a third pixel switching element including a control electrode which receives a compensation gate signal, a first electrode connected to the third pixel node, and a second electrode connected to the first pixel node;

a fourth pixel switching element including a control electrode which receives a data initialization gate signal, a first electrode which receives an initialization voltage, and a second electrode connected to the first pixel node;

a fifth pixel switching element including a control electrode which receives an emission signal, a first electrode which receives a pixel high power voltage having a relatively high level, and a second electrode connected to the second pixel node;

a sixth pixel switching element including a control electrode which receives the emission signal, a first electrode connected to the third pixel node, and a second electrode connected to a fourth pixel node;

a seventh pixel switching element including a control electrode which receives a light-emitting element initialization gate signal, a first electrode which receives a light-emitting element initialization voltage, and a second electrode connected to the fourth pixel node;

a storage capacitor including a first electrode which receives the pixel high power voltage and a second electrode connected to the first pixel node; and a light-emitting element including an anode electrode connected to the fourth pixel node and a cathode electrode which receives a pixel low power voltage having a relatively low level.

19. The display device of claim 18, wherein a signal output from the masking circuit is the compensation gate signal.

20. The display device of claim 18, wherein a signal output from the masking circuit is the data initialization gate signal.

* * * * *